(12) United States Patent
Hansl

(10) Patent No.: US 6,923,612 B2
(45) Date of Patent: Aug. 2, 2005

(54) LOAD-HANDLING SYSTEM AND TELESCOPIC ARM THEREFOR

(75) Inventor: Rudolf Hansl, Altmünster (AT)

(73) Assignee: TGW Transportgeräte GmbH & Co. KG, Wels (AT)

( * ) Notice: Subject to any disclaimer, the term of this patent is extended or adjusted under 35 U.S.C. 154(b) by 130 days.

(21) Appl. No.: 10/112,084

(22) Filed: Mar. 29, 2002

(65) Prior Publication Data

US 2003/0185656 A1 Oct. 2, 2003

(51) Int. Cl.$^7$ .................................................. B65G 1/00
(52) U.S. Cl. ....................................... 414/277; 414/280
(58) Field of Search ................................ 414/277, 279, 414/280, 281, 807; 198/621, 463.3, 586

(56) References Cited

U.S. PATENT DOCUMENTS

| | | | |
|---|---|---|---|
| 4,690,602 A | * | 9/1987 | Castaldi et al. .............. 414/280 |
| 5,002,449 A | | 3/1991 | Kita et al. |
| 5,213,463 A | * | 5/1993 | Rothlisberger et al. ...... 414/280 |
| 5,328,316 A | * | 7/1994 | Hoffmann .................... 414/277 |
| 5,385,243 A | * | 1/1995 | Jackson et al. .............. 414/280 |
| 5,445,485 A | * | 8/1995 | Poutet ......................... 414/280 |
| 5,839,872 A | * | 11/1998 | Goto et al. .................. 414/277 |

FOREIGN PATENT DOCUMENTS

| | | |
|---|---|---|
| DE | 39 17 485 | 12/1990 |
| DE | 4422240 A1 | 1/1995 |
| DE | 29815784 U1 | 11/1998 |
| DE | 20012197 U1 | 2/2001 |
| DE | 20021029 U1 | 5/2001 |
| DE | 10065084 A1 | 1/2002 |
| EP | 0 643 010 | 3/1995 |
| EP | 0 801 024 | 9/2003 |

* cited by examiner

Primary Examiner—Eileen D. Lillis
Assistant Examiner—Thuy V. Tran
(74) Attorney, Agent, or Firm—Collard & Roe, P.C.

(57) ABSTRACT

A telescopic arm of a load-handling system for transferring storage units into and out of a rack stage of a racking system is displaceably supported on a support frame and has a plate-shaped middle slide and a plate shaped top side displaceable relative to the support frame and to each other. The support frame is in the form of a hollow section and has first and second upright longitudinal side walls and a bottom and a top side wall. Lateral guide tracks and a vertical guide track are arranged on the first upright longitudinal side wall. The top slide has lateral guide tracks and a vertical guide track as well as movable drivers for pushing a front or rear face of the storage unit. The middle slide is slidably guided between the support frame and top slide.

29 Claims, 16 Drawing Sheets

LOAD-HANDLING SYSTEM AND TELESCOPIC ARM THEREFOR

TECHNICAL FIELD

The invention relates to a telescopic arm of a load-handling system for transferring storage units into or out of a rack stage of a racking system, which is guided in a respective guide mechanism extending in the longitudinal direction of a support frame with a lateral and vertical guide track, and a load-handling system for transferring storage units into and out of a rack stage of a racking system with two parallel support frames spaced at a distance apart for synchronously displaceable telescopic arms on a loading platform of a conveyor vehicle, e.g. a rack serving unit, each of which is guided in a guide mechanism extending in the longitudinal direction of the support frame with a lateral and vertical guide track.

THE PRIOR ART

A load-handling system is known from patent specifications DE 44 22 240 A1 and U.S. Pat. No. 5,002,449 for transferring containers into and out of a rack stage of a racking system, whereby two telescopic arms arranged on a loading platform can be extended in the direction of the rack stage and displaced by a distance towards and away from one another. The telescopic arms have several slides which are guided in spaced apart guide rails by means of vertical and lateral guide rollers and which engage the pallets with catches arranged thereon. The pallets may be pushed onto bearing tracks of the rack into a first or as far as a second rack row.

A telescopic conveyor for manipulating loads horizontally is also known from DE 100 65 084 A1. The telescopic conveyor has individual prongs or several prongs forming a fork, mounted on one area or on several areas, on a stationary and/or displaceable systems such as tables, lift platforms, displaceable slides, floor conveyors, rack serving units, between conveyor runs and/or rack aisles, and consists of a plurality of moulded sections inserted one in the other. The base section is an upwardly open C-section, in which runner tracks are fixedly mounted on both sides. The free space left between the top edge of the runner track pair and the bottom edge of the C-section is used as a guide track on either side for the first support rollers on either side. The handling table is a downwardly open C-section, in of which tracks are fixedly mounted on both sides. The middle section, to which a driving force can be applied by means of a rack and pinion drive mechanism, is a downwardly open U-section, on the legs of which the two support rollers are fixedly disposed on both sides, mounted flush with one another. The primary disadvantage of these systems is that a large amount of space is needed to mount the requisite guide and support rollers for the middle and the handling table and the capacity of the load-handling system is severely restricted.

A load-handling system used for transferring containers into and out of racks is known from patent specification DE 298 15 784 U1, which has at least one telescopic table displaceable on a bottom table, provided with a circulating conveyor belt driveable by means of a traction drive, the traction means of which is guided by the drive via two pulley blocks of the bottom table crossing with two pulley blocks of the telescopic table, which act on the conveyor belt.

A conveyor system is also known from patent specification DE 200 21 029 U1 having a conveyor belt mounted so as to be displaceable on a table, stops being arranged on the two ends of the conveyor system, which can be raised and lowered so as to engage in the path of the article being conveyed. The stops are provided at the two ends of the conveyor system on either side of the conveyor belt.

A load-handling system is also known from patent specification DE 200 12 197 U1, having a respective bottom part, which is stationary in particular, and a top part displaceable by a traction or thrust means, a conveyor belt which can be driven by a traction means being mounted on the top part. A driver displaceable in the longitudinal direction on a linear guide or similar is guided by means of a driving gear, which is linked to a gear driven by a traction drive arranged on the bottom part. The driving gear and the gear are of differing diameters and the traction means for the conveyor belt is linked to the driver.

The disadvantage of all of these systems is that a large amount of installation space is needed for the one endless drive element, e.g. chain, belt, for transmitting a feed motion to the individual slides of the telescopic arms enabling its multiple deflections, with the unavoidable disadvantage that the rack storage capacity can be used to only a low degree because the vertical distance needed to lower the storage unit, e.g. pallet, box, between two rack stages disposed in planes one above the other is considerably increased as a result.

OBJECTIVE AND ADVANTAGES OF THE INVENTION

The objective of the invention is to propose a telescopic arm and a load-handling-system, in which the introduction thereof and removal thereof into and from a rack stage requires only a very low height, affording a compact structure of few individual parts.

This objective is achieved according to one aspect of the invention with a telescopic arm of a load-handling system for transferring storage units into and out of a rack stage of a racking system, which is displaceably supported on a support frame having the form of a hollow section and comprises a plate-shaped middle slide and a plate-shaped top slide, the middle slide and top slide being displaceable relative to each other and to the support frame, and the middle slide being slidably guided between the support frame and top slide. The support frame comprises a first upright longitudinal side wall directed towards the middle slide, a second upright longitudinal side wall opposite the middle slide, a bottom side wall and a top side wall, the bottom and top side walls extending between the upright longitudinal side walls, and lateral guide tracks and a vertical guide track arranged on the first upright longitudinal side wall between longitudinal peripheral regions of the bottom and top side walls for laterally and vertically guiding the middle slide along the support frame, each guide track extending in the longitudinal direction and essentially along the entire length of the support frame. The top slide comprises lateral guide tracks and a vertical track guide directed towards the support frame, each guide track extending in the longitudinal direction and essentially along the entire length of the top slide. The middle slide comprises oppositely disposed side walls and guide lands arranged on both of the oppositely disposed side walls and protruding into said lateral and vertical guide tracks of the support frame and the top slide, each guide land extending in the longitudinal direction and essentially along the entire length of the middle slide. At least two drivers are arranged on each distal end region of the top slide, the drivers being displaceable transversely to the longitudinal direction of the top slide from a rest position into an operating position, whereby a respective one of the drivers in the rest position is able to be positioned in a seating region in the top slide and, in the operation position, the driver projects beyond an external boundary of the top slide and overlaps a respective one of the storage units at one of two opposing front and rear side faces thereof relative to an extension direction of the telescopic arm, and an actuator motor is arranged on the top slide for moving each driver between the rest and operating position.

The surprising advantage is that because the lateral and vertical guide tracks are arranged directly on the longitudinal side wall of the support frame and on the side of the top slide facing the support frame, the free space available in any event between the top slide and the base frame can be utilised to accommodate the middle slide and the resultant compact and lightweight construction means that the telescopic arms can be displaced at high speeds relative to the base frame.

It is of advantage if the guide surfaces of the vertical and lateral guide tracks are provided with a friction coating, reducing friction-induced wear on the telescopic arms, which are displaceable relative to one another.

A top slide whose lateral guide tracks have a U-shaped cross section and guide faces extending parallel to the first longitudinal side wall, and whose vertical guide tracks have a U-shaped cross section and guide faces extending perpendicular to the first longitudinal side wall, offers the additional option of attaching other components thereto, such as actuators motors, sensors, etc.

Advantageously, the top slide is designed to be guided on the middle slide and is able to accommodate the actuator motors for the drivers, and/or sensors for monitoring an operating and rest position of the drivers, and/or control lines for the transmission of power and/or signals and interfaces, e.g. terminal strips.

A plate-shaped middle slide manufactured in the form of a moulded element of fibre-reinforced synthetic material can be made in a single piece and helps to reduce weight whilst affording a high degree of dimensional stability. Middle slides of this type are simple in structure and inexpensive to produce.

Using aluminium sections for the support frame and/or the top slide has the advantage of reducing the weight of the load-handling system and extruded aluminium sections of this type. For example, can be manufactured to a high degree of accuracy, which is conducive to the guide properties, running accuracy and, in a broader sense, positioning accuracy for manipulation purposes, e.g. when introducing and removing storage units, and to the guiding accuracy between the support frame and middle and top slides.

Also of advantage is the provision of a traction drive linked to the support frame so that the top slide can be used to transmit a driving force from the middle slide to the top slide and tension plies in a first belt of the traction drive transmit power and/or signals between the support frame and the top slide. This provides an easy means of setting up a link to control the transmission of power and/or signals between the actuators and/or sensors provided on the top slide, via an interface provided on the support frame, for example, and a primary control system, i.e. programmable logic controller, computer control.

According to another aspect, the objective of the invention is also achieved with a load-handling system arranged on a vertically and horizontally movable loading platform of a conveyor vehicle for transferring storage units into and out of a rack stage of a racking system, the two telescoping arms synchronously displaceable and supported on two support frames having the form of a hollow section, the support frames extending parallel to, and at a distance from, each other. Each telescopic arm and each support frame has the above-described structure.

The advantage of the load-handling system with the support frames for the telescopic arms is that at least one storage unit received between the support frames disposed at a distance apart from one another can be laterally guided in and out of a rack stage during insertion and removal for example, and aligned by means of the telescopic arms, for example pushed on a rack stage, without damaging the side walls of the storage unit.

Advantageously, a support surface forms a conveyor plane between the support frames, and the support frames and the telescopic arms provide a lateral boundary of the conveyor path for the storage unit to be manipulated on the loading platform.

Synchronising the actuator motors for the telescopic arms and the endless conveyors avoids any increase in friction which might otherwise occur between the storage units to be handled due to a difference between the circulation speed of the endless conveyor and the displacement speed of the telescopic arms.

BRIEF DESCRIPTION OF THE DRAWINGS

The invention will be described in more detail below with reference to the embodiments illustrated in the appended drawings. Of these.

DETAILED DESCRIPTION

Figure 1:
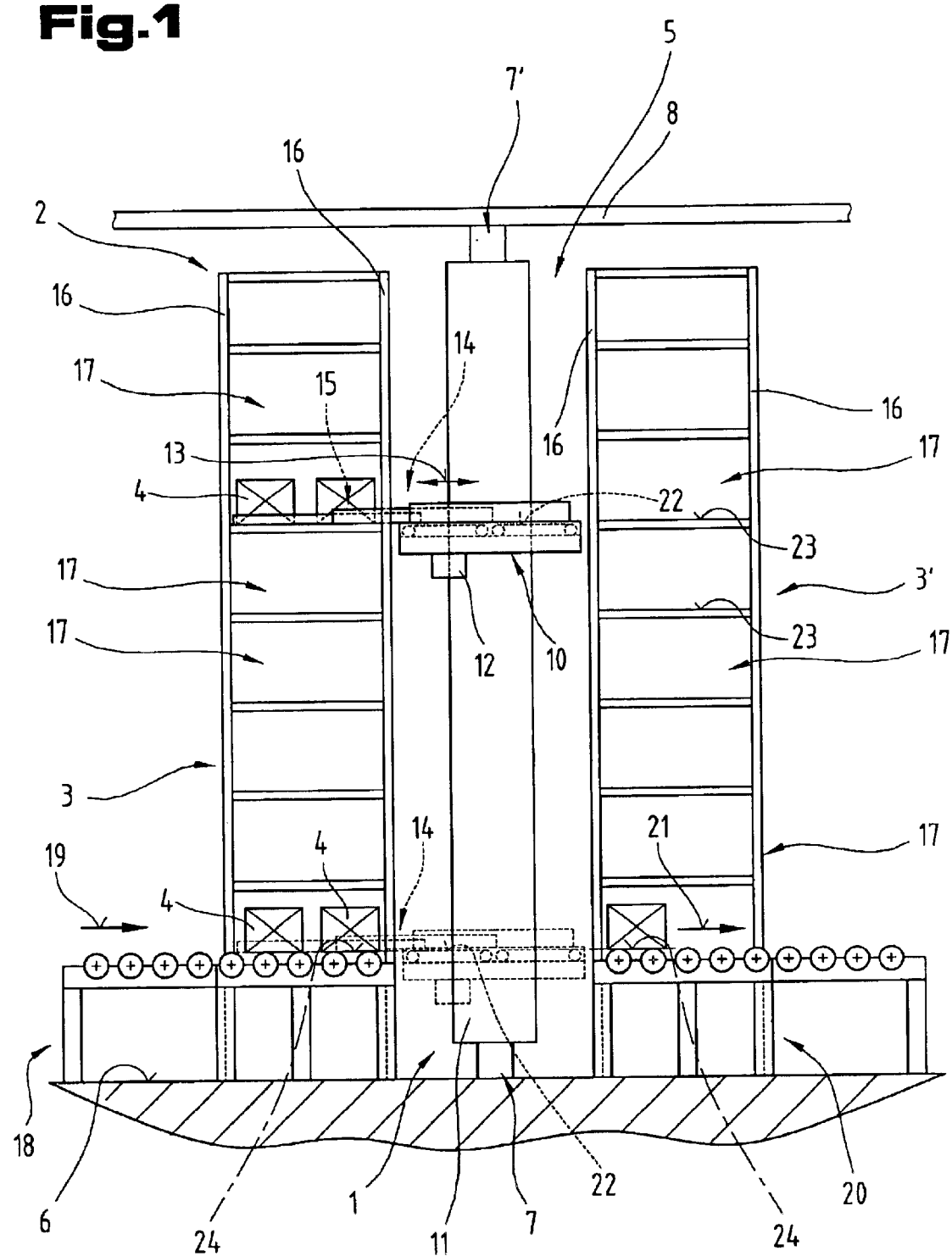
FIG. 1 is a front view of a racking system and a conveyor vehicle, in particular a rack serving unit, with a load-handling system on a loading platform.

Firstly, it should be pointed out that the same parts described in the different embodiments are denoted by the sa me reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may also be construed as independent inventive solutions or solutions proposed by the invention in their own right.

Figure 2:
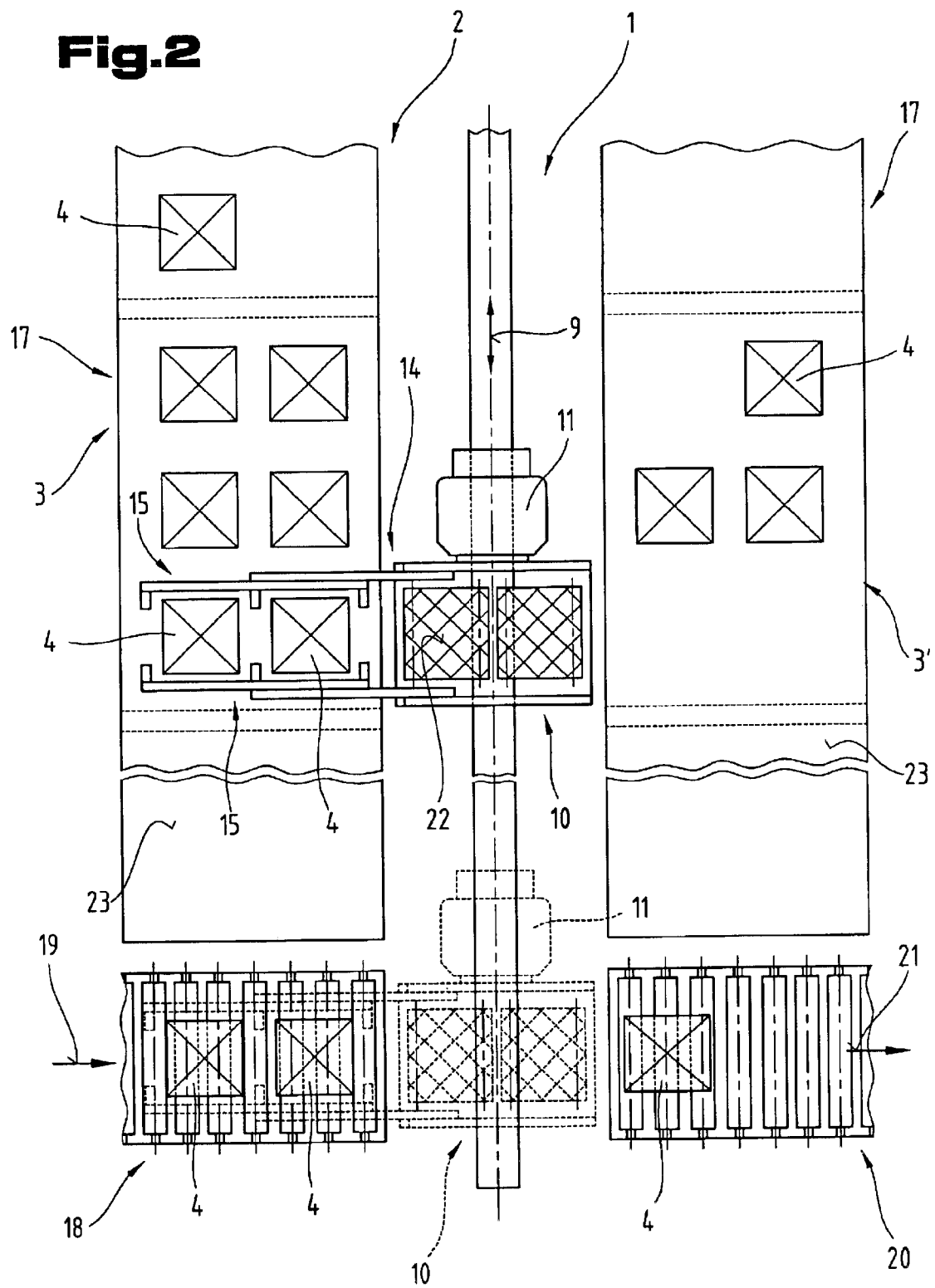
FIG. 2 is a highly simplified, schematic diagram showing a plan view of the load-handling system proposed by the invention in the process of transferring storage units into or out of a rack stage.

FIGS. 1 and 2, which will be described together, show a conveyor vehicle, in particular a rack serving unit 1, and a racking system 2, in this example an upright rack system with rack bays 3, 3' for stacking storage units 4, in particular containers, boxes, etc. The rack serving unit 1 is designed so as to be displaceable in an aisle 5 between two spaced apart rack bays 3, 3', in the direction of the aisle—indicated by double arrow 9—along a track 7 and a track 7' running on a support surface 6 alongside a ceiling of the racking system 2 by means of bogie assemblies and at least one drive arrangement, not illustrated in detail. Rack serving units 1 of this type with a vertically adjustable loading platform 10 are generally known and are described in patent specifications DE 44 05 952 A1 or DE 195 34 291 A1 or DE 196 14 660 A1 or FR 2 549 814, for example. The loading platform 10, which is vertically adjustable in the direction of a mast 11 extending perpendicular to support surface 6, is guided by means of vertical and/or lateral guide members, not illustrated in detail, on at least one guide path on the mast 11 and is substantially vertically displaceable along the guide paths by means of a drive mechanism 12. The loading platform 10 is provided with a retractable unit 14 displaceable in a plane extending parallel—indicated by double arrow 13—to support surface 6, which is fitted with two telescopic arms 15 preferably telescopically extendable and retractable in opposite directions. As illustrated, the later serves rack bays 3, 3' provided on either side of the aisle 5 for introducing and removing the storage units 4 and irrespective of whether transferring the storage unit 4 into or out of the position adjacent to the aisle 5 or transferring the storage units 4 into the position remote from the aisle 5 or both together. As may be seen from FIG. 1, each of the bays 3, 3' has a plurality of rack uprights 16 perpendicular to the support surface 6 and, between them, rack stages 17 disposed in horizontal planes at a distance apart from one another. Plate-shaped rack floors extend horizontally, parallel to support surface 6, permitting storage within a rack stage 17 in several rows one after the other. It should be pointed out that the rack bays 3, 3' may also be in the form of individual bays, although the more economic solution is the double-bayed system illustrated in the example.

As also illustrated in FIG. 1, an incoming conveyor system 18, in particular a roller conveyor, to transport the storage units 4 is arranged upstream of the rack serving unit 1, preferably at the start and/or end of the aisle 5. The storage units 4 are conveyed towards the rack serving unit 1—in the direction of arrow 19. Downstream of the rack serving unit 1 is an outgoing conveyor 20, in particular a roller conveyor. The storage units 4 are transported away from the rack serving unit 1—in the direction of arrow 21. Instead of the roller conveyor, it would naturally also be possible to use belt conveyors. The incoming conveyor system 18 upstream of the rack serving unit 1 may be a steel roller conveyor of the type known from the prior art, for conveying storage units 4, e.g. containers, boxes, in an accumulation system such as known from patent specifications US 2002/0008007 A1 or U.S. Pat. Nos. 5,862,907 A or 6,302,266 B1, for example.

As may be seen from FIGS. 1 and 2, the retractable unit 14 illustrated in this embodiment has two telescopic arms 15, telescopically extendable and retractable in both directions relative to the loading platform 10. If at least one storage unit 4 is to be introduced into a rack stage 17 from the loading platform 10 or transferred from the rack stage 17 to the loading platform 10, the rack serving unit 1 is positioned in the aisle direction—indicated by double arrow 9—with its loading platform 10 in front of the relevant rack stage 17 and in the height direction of the mast 11 so that a conveyor plane 22, which will be described in more detail below, and a support surface 23 of the rack stage 17 for the storage units 4 extend flush with one another and the telescopic arms 15 are positioned centred in front of at least one storage unit 4 to be transferred in or out. The telescopic arms 15 are disposed at a level higher than the conveyor plane 22 so as to be retractable and extendable in a horizontal plane extending above the support surface 23.

If, on the other hand, at least one storage unit 4 is to be transferred via the loading platform 10 from the incoming conveyor system 18 or at least one storage unit 4 located on the loading platform 10 is to be transferred to the outgoing conveyor 20 downstream of the rack serving unit 1, the rack serving unit 1 and the loading platform 10 are positioned in the aisle direction—indicated by double arrow 9—in front of the incoming or outgoing conveyor system 18; 20 and in the height direction so that the conveyor plane 22 extending parallel with the standing surface 6 runs parallel with the loading platform 10 and flush with the conveyor plane 24 of the delivery or discharge conveyor 18, 20 and the telescopic arms 15 are positioned centrally relative to the at least one storage unit 4 to be picked up, whereupon the at least one storage unit 4 is pushed onto the loading platform 10.

Figure 3:
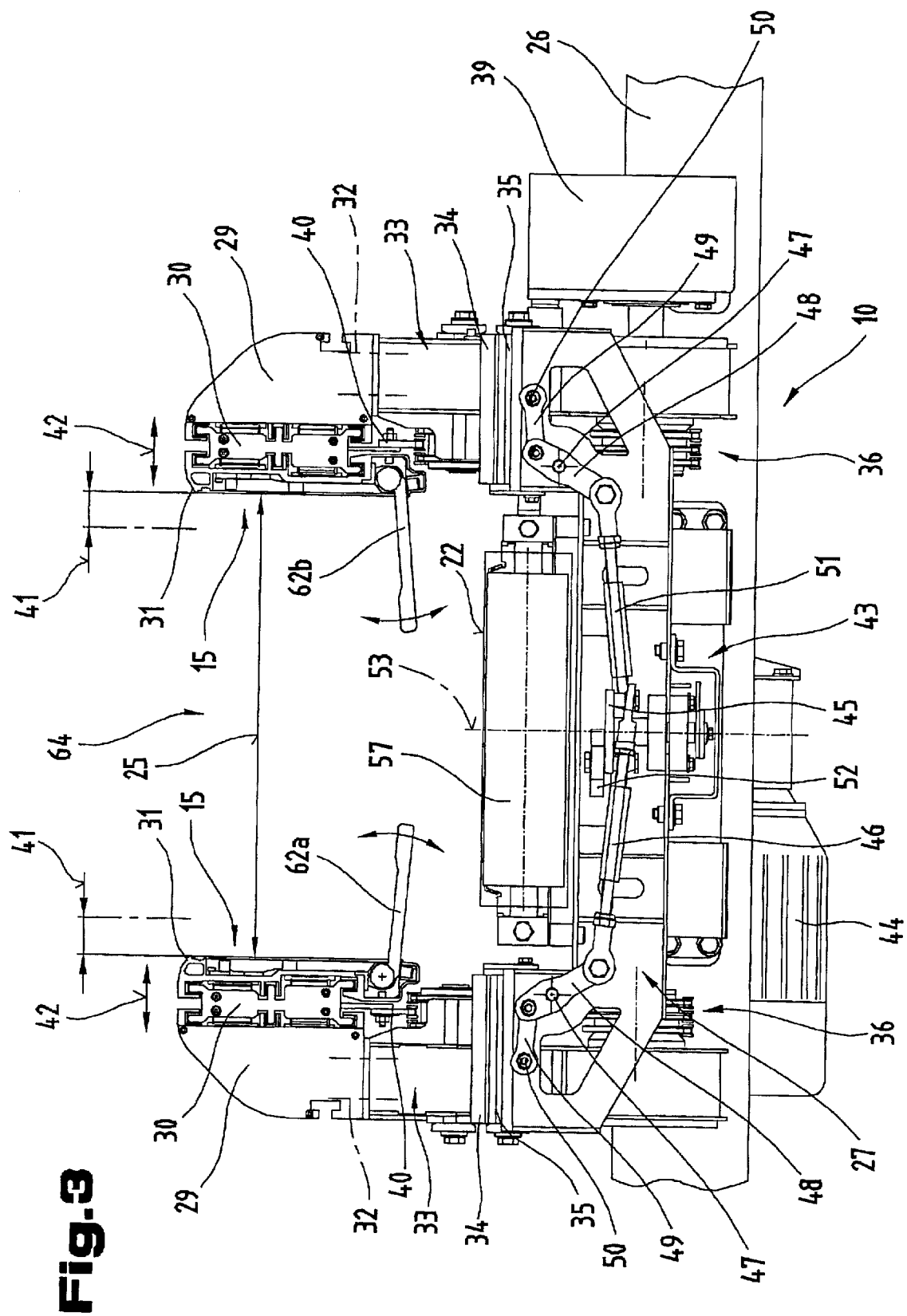
FIG. 3 is a highly simplified diagram showing an end-on view of the load-handling system proposed by the invention.
Figure 4:
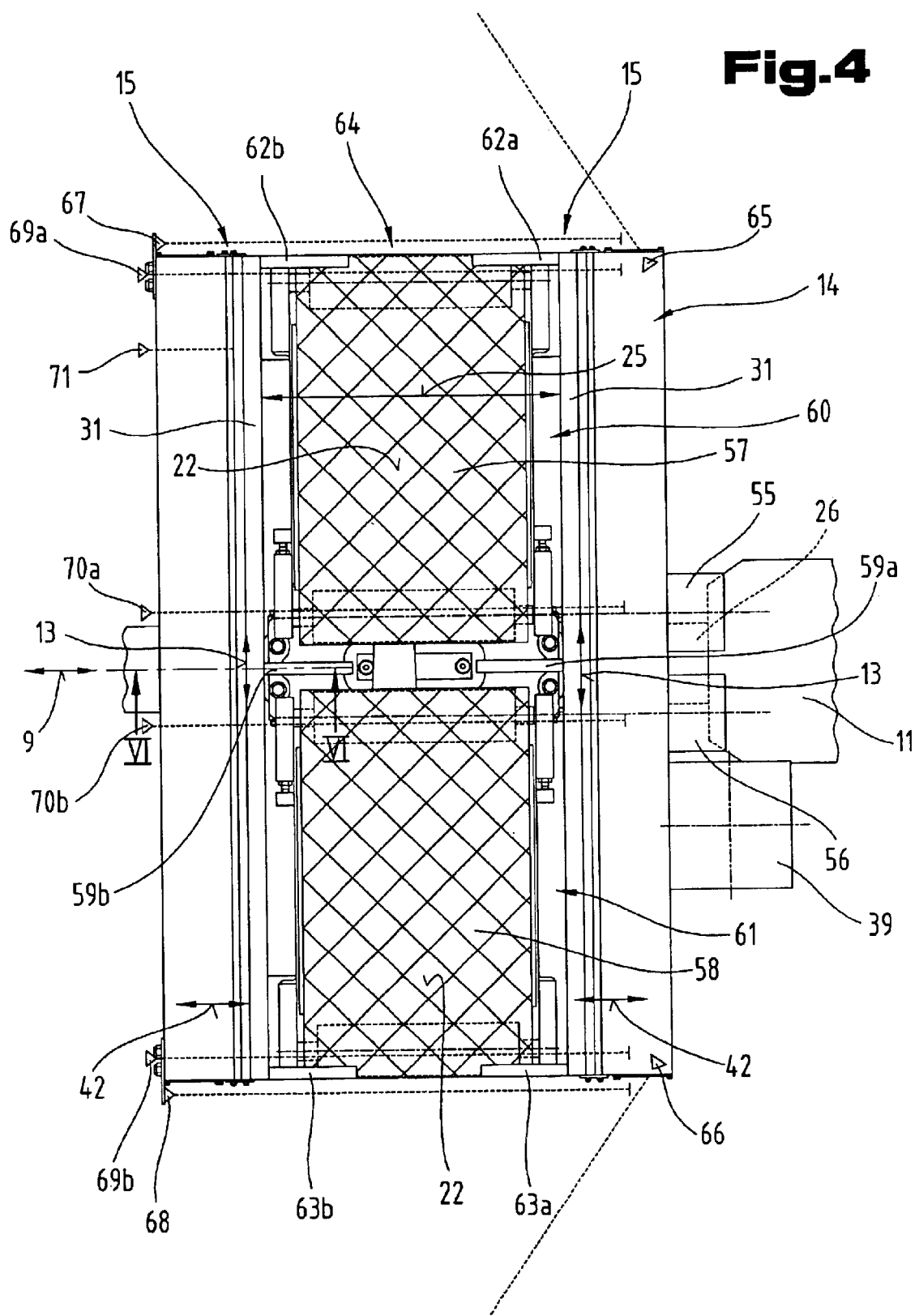
FIG. 4 is a highly simplified diagram showing a front view of the load-handling system illustrated in FIG. 3 with the telescopic arms withdrawn in the initial position.
Figure 5:
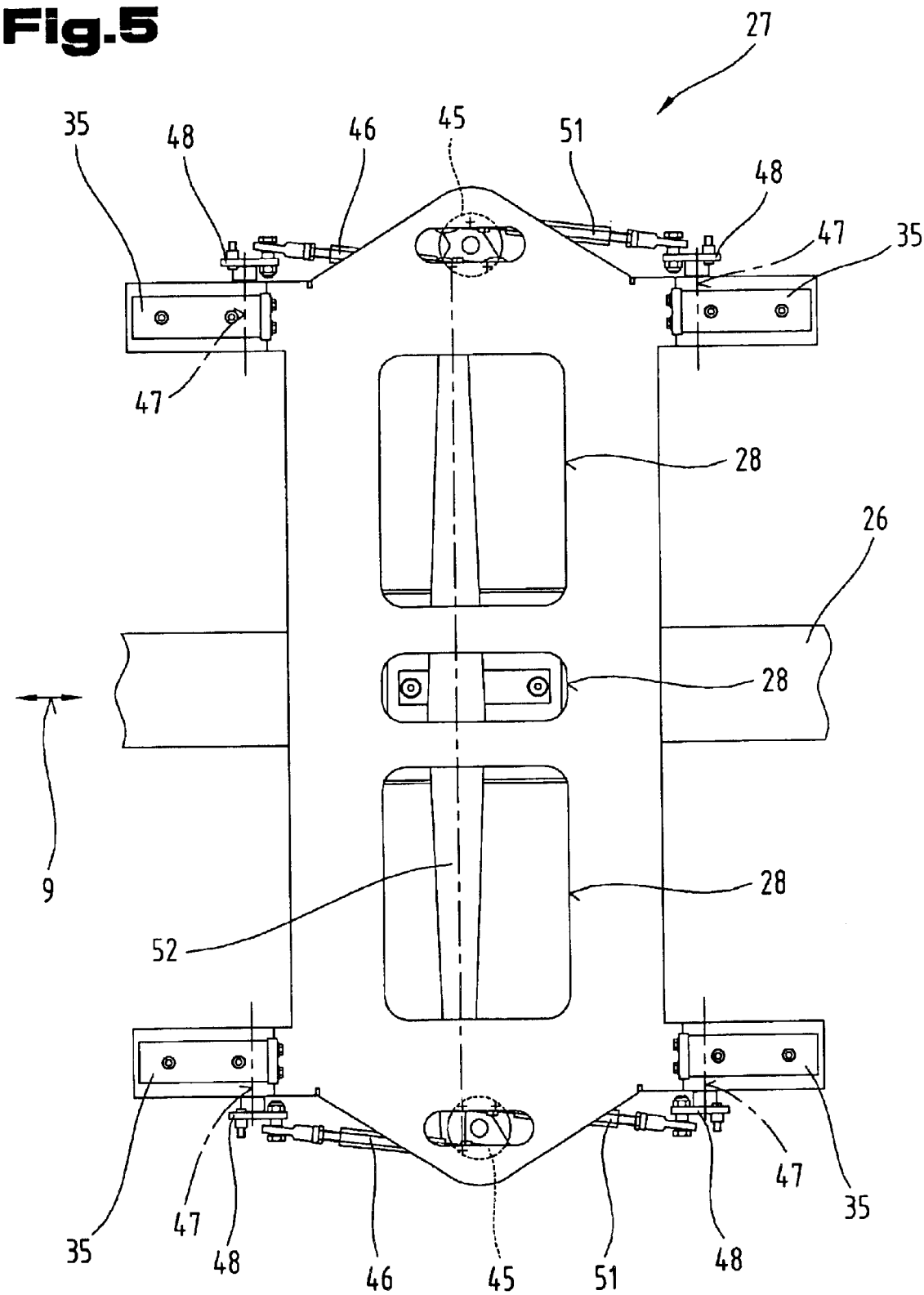
FIG. 5 is a highly simplified, schematic diagram showing a plan view of a base frame for the load-handling system proposed by the invention.

FIGS. 3 to 5, which will be described together, illustrate a load-handling system for transferring storage units 4 into and out of a rack stage 17 of a racking system 2 and for picking up storage units 4 from delivery areas, e.g. the incoming conveyor 18, not illustrated, and for despatching storage units 4 to despatch areas, e.g. the outgoing conveyor 20 not illustrated, consisting of two mutually parallel telescopic arms 15 spaced at a distance 25 apart, which are mounted on a loading platform 10 of the rack serving unit 1, not illustrated in detail in these drawings. In the embodiment illustrated as an example here, the loading platform 10 has a load-bearing support 26 and a base frame 27 illustrated in FIG. 5. The base frame 27 is fixedly joined to the load-bearing support 26, in particular by welding or screw fittings, and is of a plate-shaped design having a plurality of orifices 28 to reduce the weight of the load-handling system. Two support frames 29 arranged at a distance apart, having respectively at least one middle slide 30 and a top slide 31, are fixedly joined by means of a fixing arrangement 32, e.g. screws, to a bearing slide 33 so as to be displaceable therewith transversely to the longitudinal direction of the support frame 29, as may be seen in more detail from FIG. 7.

On a side directed towards the base frame 27, the distal end regions of the frame-like bearing slide 33 are fitted with at least two guide rails 34, substantially C-shaped in cross section, extending transversely to the longitudinal direction of the support frame 29 and fixedly joined to the bearing slide 33, which, at distal end regions, mutually engage in a positive arrangement on either side in guide rails 35 of a shape complementing the guide rails 34 on the more or less rectangular base frame 27. The guide rails 34, 35 forming a guide system may naturally all be provided in the form of linear guides known from the prior art, such as a dovetail, ball bearing guideways, etc.

Figure 7:
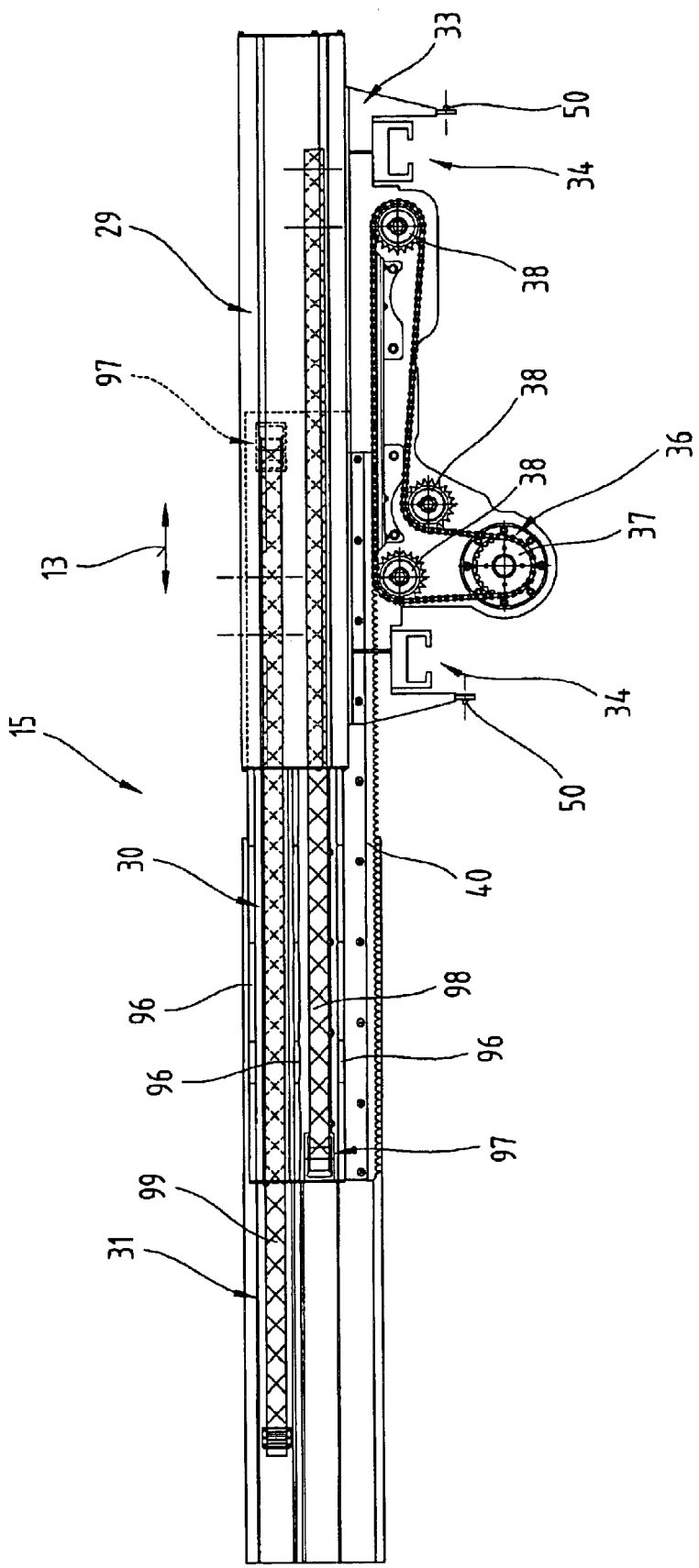
FIG. 7 is a simplified diagram in a side view, showing the telescopic arm illustrated in FIG. 6 with the support frame, middle and top slides proposed by the invention and a bearing slide supporting the telescopic arm.

As illustrated by viewing FIGS. 3 and 7 in conjunction with one another, a circulating drive element 36 is arranged on the bearing slide 33 or support frame 29, e.g. an endless, circulating drive means such as a chain drive. The endless drive element 36 is relayed around a driving gear 37 and several following gears 38 and is driven by at least one drive motor 39. The circulating drive element 36 positively engages with at least one driver 40, e.g. a rack, mounted in a stationary arrangement on the middle slide 30 facing the drive element 36. The driving gear 37 is coupled with a shaft on the drive motor 39, in particular a servo-motor or stepper motor, to transmit a driving force. By preference, a drive element 36 co-operates with each telescopic arm 15 and the two drive elements 36 are drivingly joined to one another by means of a longitudinally displaceable universal shaft with spline, not illustrated, being coupled with a single drive motor 39 only so that the drive elements 36 are synchronously driven. Naturally, it would also be possible for a separate drive motor 39 to be assigned to each drive element 36 and synchronise the rotation speed of the two drive motors 39. The two drive elements 36 synchronously transmit a driving force to the driver 40 arranged on the middle slide 30 and displace the two middle slides 30 in a linear motion. The rack is made from a metal material and is joined to the middle slide 30 so as to be displaceable therewith. Naturally, another option would be to use a drive element 36 comprising several synchronously driven drive elements, e.g. sprocket wheels, distributed at a distance apart from one another across the length of the bearing slide 33 and support frame 29. The telescopic arms 15 can be displaced to the left and right relative to the support frame 29 by changing the rotation direction of the drive motor 39 and the circulation direction of the drive elements 36.

In the embodiment of the invention illustrated as an example here, not only can the telescopic arms 15 be displaced transversely to the aisle direction—indicated by double arrow 9—in the extension direction—indicated by double arrow 13—they can also be displaced towards and apart from one another by a centring motion 41, as schematically indicated, transversely to the longitudinal direction of the support frame 29. How and to what end the centring motion 41 is effected will be explained in more detail with reference to FIGS. 14 to 19 below. An adjusting mechanism 43 is provided between the two telescopic arms 15 to effect the synchronous relative displacement of the two telescopic arms 15—indicated by double arrow 42.

This adjusting mechanism 43 is illustrated in more detail in FIGS. 3 and 5. The adjusting mechanism 43 for synchronously displacing the telescopic arms 15 transversely to the longitudinal direction of the support frame 29 as indicated by double arrow 42 has a drive 44 and, coupled therewith, a flange plate 45 selectively displaceable in rotation to the left or right. The flange plate 45, concentrically arranged on a drive shaft, is joined via first lengthwise displaceable or length-adjustable rod linkages 46 to two lever arms 48, 49 mutually linked by a joint 47 in the form of a knee-joint, the free end of the lever arm 49 being linked to a joint 50 on the bearing slide 30. By means of another length-adjustable rod linkage 51, the flange plate 45 is linked to two other lever arms 48, 49 reciprocally linked by the joint 47 in the form of a knee-joint, the free end of the lever arm 49 in turn being linked to the joint 50 on the bearing slide 33 of the other telescopic arm 15.

The adjusting mechanism 43 applies a synchronously transmitted displacement force to two displaceable bearing slides 33 arranged in the longitudinal peripheral region of the guide system via the rod linkages 46, 51 and lever arms 48, 49, for which purpose the two flange plates 45 are articulatingly joined to one another via a push rod 52. In this particular embodiment, only a single drive 44 is used for synchronously displacing the telescopic arms 15—in the direction of double arrow 42. The linkage points for the first end of the rod linkages 46, 51 and push rod 52 are preferably offset from one another by an angle of 120°.

A rotating motion of the two flange plates 45 linked via the push rod by means of a single drive 44 causes the two lever arms 48 to pivot about the joints 47 and the two lever arms 49 co-operating with the distal end region of the bearing slide 33 of the two telescopic arms 15 are displaced towards one another or apart from one another relative to a plane of longitudinal symmetry 53. As a result, the distance 25 between the telescopic arms 15 can be reduced by the maximum centering motion 41 of the two telescopic arms 15. The requisite centering motion 41 can be fixed by means of the length-adjustable rod linkages 46, 51 and is preferably between 5 mm and 40 mm, in particular between 10 mm and 30 mm, for example 20 mm. The primary advantage of this embodiment is that when transferring storage units 4 from the rack stage 17 onto the loading platform 10, for example, preferably before sliding the two telescopic arms 15 out towards the storage unit 4, the telescopic arms 15 are moved to their maximum distance 25 apart from one another so that even if there are variations in the dimensions of the storage units 4, e.g. due to deformation thereof, the storage unit 4 can be prevented from colliding with the retractable unit 14. Another option would be to connect he bearing slide 33 to the base frame 27 of the loading platform 10 to prevent it from being displaced and dispose the guide rails 34, 35 forming the guiding system transversely to the longitudinal direction of the vertical and lateral guide tracks 77, 78 of the support frame 29, between the bearing slide 33 and the support frame 29.

As may also be seen from the drawings, two endless conveyors 57, 58, in particular belt conveyors, are provided one immediately behind the other and alternately driveable by drive motors 55, 56, between the telescopic arms 15 which can be adjusted by a slight degree transversely to the longitudinal direction of the support frame 29. The top slides 31 of the telescopic arms 15 each have a driver 59a, 59b displaceable from a non-operating position into an operating position in the middle region and this pair of drivers 59a, 59b divides a conveyor path on the loading platform 10 into two separate conveyor zones 60, 61 connected to one another by a control system. Also disposed at distal end regions of the top slide 31 is a respective driver 62a, 62b; 63a, 63b synchronously displaceable in the direction of the endless conveyor 57, 58, the pairs of drivers 59a, 59b and 62a, 62b delimiting the first conveyor zone 60 and the pairs of drivers 59a, 59b and 63a, 63b delimiting the second conveyor zone 61. The drive or the circulating direction of the two endless conveyors 57, 58 may be alternately halted or changed on command via a primary control system, whereupon the feed direction of a storage unit 4 located on the endless conveyor 57; 58 is selectively changed, although this is not illustrated.

Accordingly, the storage units 4 located on the endless conveyor 57; 58 can be fed along the conveyor path 64 between the drivers 59a, 59b displaced into the operating position in the middle region and in one of the distal end regions 62a, 62b or 63a, 63b. If the two drivers 59a, 59b are displaced in the middle region out of the conveyor path 64 into the non-operating position within the top slide 31, the individual storage units 4 can be moved linearly between the two pairs of distally arranged drivers 62a, 62b; 63a, 63b and in the longitudinal direction of the support frame 29 and positioned. A detailed description of how storage units 4 are transferred into and out of a rack stage and how storage units 4 are picked up from delivery areas and storage units 4 are discharged to despatch areas will be described below.

As illustrated in FIG. 4, the load-handling system has a plurality of position and status-monitoring elements. In the distal end regions of the telescopic arms 15 facing the rack bay 3, 3', at least one light sensor 65, 66 is provided for detecting the rack occupancy of the first row adjacent to the aisle and/or second row remote from the aisle in the rack stage 17 of the rack bay 3, 3', with a transmitting and receiving beam directed at an angle towards the conveyor paths 64. Also provided in the distal end regions of the load-handling system are optical sensors 67, 68 for monitoring a gap formed between an end face of the load-handling system and an end face of the rack stage 17 or a conveyor system 18; 20 whilst the storage unit 4 is being transferred between the load-handling system and the rack stage 17 or the load-handling system and the conveyor system 18; 20. The transmitting and receiving beam is directed transversely to the extension direction—indicated by double arrow 13. In order to monitor the occupancy status and for monitoring the position of the storage units 4 located on the endless conveyor 57, 58, which is not illustrated in this drawing, an optical sensor 70a, 70b, 69a, 69b is provided respectively in the vicinity of a pair of drivers 59a, 59b and 62a, 62b and 63a, 63b. The transmitting and receiving beams of the optical sensors 70a, 70b, 69a, 69b are directed transversely to the extension direction—indicated by double arrow 13. An optical sensor 71 is provided in order to fix a reference position of the middle and top slides 30, 31 relative to the support frame 29.

It should be pointed out at this stage that the load-handling system of the embodiments illustrated in FIGS. 3 to 5 are capable of handling only storage units 4 with the same external dimensions, that is to say length and width.

Figure 6:
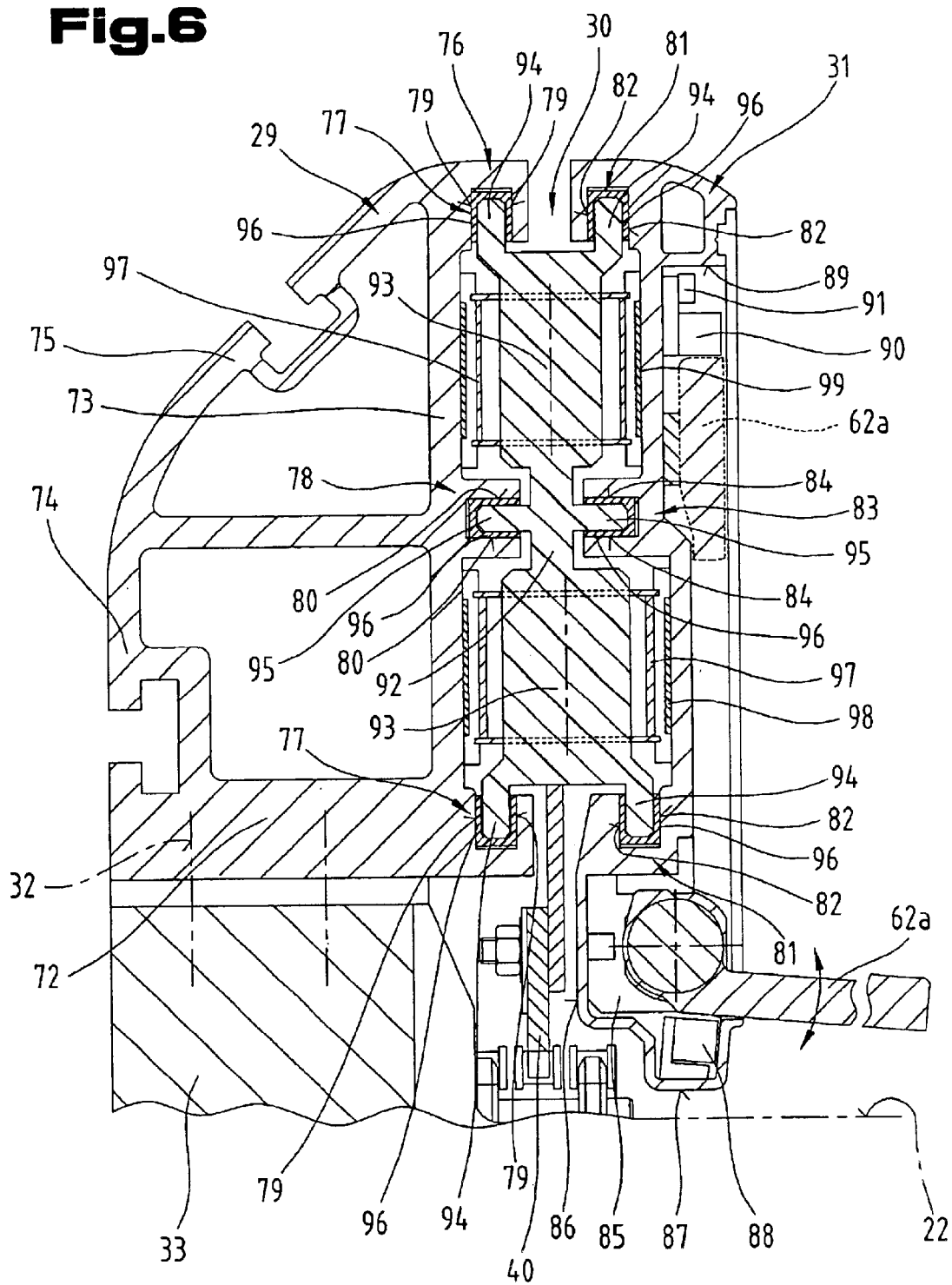
FIG. 6 is a simplified diagram in section along the line VI—VI of FIG. 4 showing one of the telescopic arms with a support frame, middle and top slides proposed by the invention.

FIGS. 6 and 7, which will be described together, show a part of the support frame 29 for a telescopic arm 15 of the load-handling system, with a displaceable bearing slide 33 joined thereto, as described above, in section and in a front view. The telescopic arm 15 has the middle and top slide 30, 31. The support frame 29 is a hollow section made in a single piece, preferably of aluminium, in particular an extruded aluminium section, and has a bottom side wall 72 extending parallel with the loading platform 10, a first and second upright longitudinal side wall 73, 74 and a top side wall 75 extending at an angle between the upright longitudinal side walls 73, 74. On the first longitudinal side wall 73 directed towards the middle slide 30 arranged between longitudinal peripheral regions of the top side wall 75 and the bottom side wall 72 is a guide mechanism 76 with lateral and vertical guide tracks 77, 78 extending in the longitudinal direction of the support frame 29 for the vertical and lateral guides of the middle slide 30 along the support frame 29. The lateral and vertical guide tracks 77, 78 extending along the entire length of the support frame 29 are integrally moulded and formed on the support frame 29. The lateral and vertical guide tracks 77, 78 of the support frame 29 are groove-like recesses in the hollow section and are U-shaped in cross section. Guide surfaces 79 of the lateral guide tracks 77 extend parallel with one another and parallel with the first longitudinal side wall 73.

The vertical guide track 78, U-shaped in cross section with mutually parallel guide surfaces 80 extending perpendicular to the first longitudinal side wall 73, is integrally moulded or formed between the lateral guide tracks 77 one above the other on the first longitudinal side wall 75. As may be seen from FIG. 6, extending in the longitudinal direction thereof, the support frame 29 is provided with mounting grooves for components, e.g. actuators and sensors, in the region of its second longitudinal side wall 74 and the inclined side wall 75. Mutually parallel mounting grooves for fixing means 32, in particular screws, are provided on the bottom side wall 72, likewise extending in the longitudinal direction of the support frame 29. Although not illustrated in the drawing, cables for transmitting mechanical and/or electrical power and/or signals between the support frame 29 and a central control system or top slide 31 may be accommodated in cavities bounded by the longitudinal side walls 73, 74 and side walls 72, 75 or a dividing wall extending horizontally between the longitudinal side walls 73, 74. By preference, plastics closing covers are provided on the opposing end faces of the support frame 29.

The top slide 31 is of a plate-shaped design with a substantially C-shaped cross section and has a plurality of U-shaped indentations formed therein and extending in the longitudinal direction of the top slide 31. The top slide 31 is preferably made from aluminium, in particular an extruded aluminium section, and, in longitudinal peripheral regions on a face directed towards the middle slide 30, has lateral guide tracks 81 extending in a longitudinal direction of a U-shaped cross section with guide surfaces 82 extending parallel with the planar profile. Between the two lateral guide tracks 81 on a face directed towards the middle slide 30 and extending in the longitudinal direction is a vertical guide track 83 of U-shaped cross section integral with the top slide 31 having guide faces 84 extending perpendicular to the planar section. In order to improve friction properties on the guide surfaces 79, 80, 82, 84, they may be provided with a friction coating, e.g. a plastics inlay of polytetrafluoroethylene (PTFE), acrylonitrile butadiene styrene (ABS) or the like.

Naturally, another option would be to provide the vertical and lateral guide tracks 78, 83, 77, 81 of the support frame 29 and top slide 31 as separate components and secure them to the support frame 29 and top slide 31 by fixing means, e.g. screws, rivets, an adhesive, a weld seam or solder. However, the integral design is the preferred embodiment.

As may be seen by considering FIGS. 4, 6 and 7 together, the top slides 31 of the telescopic arms 15 are provided at their distal end regions and in the middle region respectively with a driver 62a, 62b; 63a, 63b; 59a, 59b displaceable into the conveyor path 64 for the storage unit 4. The pair of oppositely facing drivers 59a, 59b or 62a, 62b or 63a, 63b of the two top slides 31 arranged in a plane disposed transversely to the extension direction—indicated by double arrow 13—and perpendicular to the conveyor plane 22 are synchronously displaceable by means of electrically operable synchronised actuators 85, in particular servo motors, from a seating region provided in the top slide 31 for the rest position—indicated by broken lines in FIG. 6—into the operating position in the conveyor path 64 of the storage units 4 and above the conveyor planes 22—indicated by solid lines in FIG. 6. The driver 59a, 59b, 62a, 62b, 63a, 63b is designed as a flap pivotable about an axis extending parallel with the lateral and vertical guide tracks 77, 78 of the top slide 31, above the conveyor plane and a displacement path between the rest and operating position is restricted by mechanical abutment surfaces of the top slide 31 or by setting the actuator 85 to a predeterminable angle, which is preferably approximately 90°.

The actuators 85 co-operating with every driver 59a, 59b, 62a, 62b, 63a, 63b and the rotation-transmitting drive elements for the drivers 59a, 59b, 62a, 62b, 63a, 63b coupled therewith are fixedly arranged in a first U-shaped recess 86 provided in the planar section, extending in the longitudinal direction of the top slide 31. The recess 86 housing the actuators 85 is arranged adjacent to the loading platform 10. Another U-shaped recess 87 is provided underneath the pivotable flap to accommodate sensors 88 co-operating with every pivotable flap, by means of which the operating positions of every individual flap are monitored. Other sensors 90 co-operating with the flaps are provided at a distance from the loading platform 10, in a recess 89 extending in the longitudinal direction of the top slide 31, to monitor the rest position of the inwardly pivoted flaps. By preference, cables and interfaces 91, e.g. terminal connectors and plug contacts, for power and signals are disposed in the U-shaped recess 89 opening towards the middle slide 31 in the opposite direction. The rest position is above the conveyor plane 22. The middle slide 30 on two oppositely lying side walls is provided with guide lands 94, 95 which locate in the lateral and vertical guide tracks 77, 78 and 81, 82 in the region of the support frame and the top slide.

As may be seen in particular from FIG. 6, the plate-shape middle slide 30 has two approximately symmetrical slide bodies 93 joined to one another via a web 92 perpendicular to the loading platform 10 and in a plane extending parallel with the loading platform 10, each having two guide lands 94 projecting in the longitudinal direction of the middle slide 30 parallel with the web 92. Two guide lands 95 are also provided on the web 92, projecting transversely in the longitudinal direction of the middle slide 30. Secured to the guide lands 94, 95 are guide tongues 96 made from plastics, e.g. polyamide (PA). The guide lands 94 of the middle slide 30 bearing the guide tongues 96 project into the lateral and vertical guide tracks 77, 78, 81, 83 of the support frame 29 and the top slide 31 and the guide lands 94 of the middle slide 30 project above the guide tracks 77, 81 so that the support frame 29 and the middle and top slides 30, 31 can be displaced in a sliding action one inside the other. The advantage of placing the slide tracks between the support frame 29 and the middle and top slides 29, 31 is firstly that they operate quietly and secondly only a small amount of space is available in which to mount the slide tracks.

The support frame 29 is joined to the top slide 31 by means of at least one traction drive in the form of a belt 98, in which tension plies are arranged, for the extension movement in a first direction, which is operated by means of at least one roller 97 arranged on the middle slide 30, and some of the tension plies are used to transmit power and or signals via an interface, e.g. plugs or terminal connectors, and are transmittingly connected to the power and/or signal transmission cables. The drawing illustrates a preferred embodiment of the telescopic arms 15 for the displacement motion thereof in both directions relative to the support frame 29, in which the middle slide 30, being a moulding of fibre-reinforced plastics, has two rollers 97, about which two separately disposed traction drives, in particular resiliently elastic belts 98, 99 or a cable, are relayed. The rollers 97 are arranged diagonally offset from one another on either side of the longitudinally extending web 92 in the two distal end regions of the slide bodies 93. A diameter of the rollers 97 is slightly larger than a width extending between the mutually parallel longitudinal side walls of the slide body 93 and the traction drives are laterally guided on the two rollers 97 between outer edges.

As described above, a driving force is transmitted from the drive member 36 via the driver 40, in particular the rack, to the middle slide 30. Depending on the direction of rotation of the drive member 36, the two top slides 31 driven by separately disposed terminal belts 98, 99 are driven to the left or right relative to the support frame 29 and the loading platform 10 and are thus pushed in or out as schematically indicated in FIG. 1, amongst others.

The first belt 98 arranged between the support frame 29 and the top slide 31 is secured by its first end to the support frame 29 and by its second end to the top slide 30 and is guided by the first roller 97 on the middle slide 30. The other belt 99 arranged between the support frame 29 and top slide 31 is secured by its first end to the support frame 29 and by its second end to the top slide 31 and is guided on the middle slide 30 by the second roller 97. The ends of the belts 98, 99 are attached to the support frame 29 and top slide 31 by fixing elements known from the prior art and tensioned accordingly by means of a tensioning device. The middle slide 30 pulls the top slide 31 via the belts 98, 99 on alternate sides at double speed in the same direction. Consequently, if the middle slide 30 is travelling at a speed of 1 m/s, the top slide 31 travels at a speed of 2 m/s. As proposed by the invention, the belts 98, 99 between the driveable middle slide 30 and the top slide 31 are used firstly to transmit the driving force between the middle and top slides 31 and secondly to transmit the power and/or signals, e.g. to actuators 85 and/or status and/or monitoring systems, e.g. sensors 88, 90. In this particular embodiment, the belt is a cogged belt and is of a known type. Belts 98, 99 of this type, in particular flat or cogged belts, are usually of a multi-ply structure and have a friction ply facing the roller 97, a top ply and a tension ply arranged in between, tension plies being arranged in the tension layer for transmitting high circumferential speeds or forces. For the purposes of the present invention, standardised belts 98, 99 with tension plies of electrically conductive material are used, e.g. aramide or steel or glass fibres. However, it would also be possible to use cables of electrically conductive material. Another possibility is to use belts in which at least one electrically conductive film is provided, extending along the entire length of the belt 98, 99. The advantage of belts 98, 99 of this type is that these films are very thin. These films may be provided in the form of form a tension ply or be integrated in the belt 98, 99 as an extra layer. The film may be an aluminium film, for example, with a thickness of between 2 $\mu$m and 30 $\mu$m or a copper film with a thickness of between 100 $\mu$m and 200 $\mu$m.

In the region of the ends of the belt 98, 99, the electrically conductive tension plies, e.g. steel braiding, are bare of the encasing friction and top layer materials and are fitted with electrical contact elements, e.g. plug connectors, electric terminals. Consequently, each of the individual tension plies can be used as a line for transmitting power and/or signals. Two tension plies are used for the voltage supply with a positive voltage level and negative voltage level and another tension ply is used as a ground. The tension plies providing the voltage supply are connected via control lines to an interface, arranged in the cavity of the support frame 29, for example. This interface is in turn connected via control lines to the external control system and or voltage supply. However, it would also be possible to transmit logical signal levels, e.g. 0 volt and 24 volt, to the interface via other tension plies in the belts 98, 99 and then on to the external control system, e.g. a programmable logic controller (PLC), computer control systems, etc., for processing in a control algorithm.

As may also be seen from FIG. 7, the support frame 29, middle and top slides 30, 31 of the load-handling system are respectively of approximately the same length so that the support frame 29, middle and top slides 30, 31 completely overlap when pushed together in the initial position. The drive member 36 is provided in the form of an endlessly circulating drive system, e.g. chain, belt, and extends along a part of the length of the support frame 29 and the bearing slide 33, less a part of a minimum length of overlap between the support frame 29 and the middle slide 30.

Figure 8:
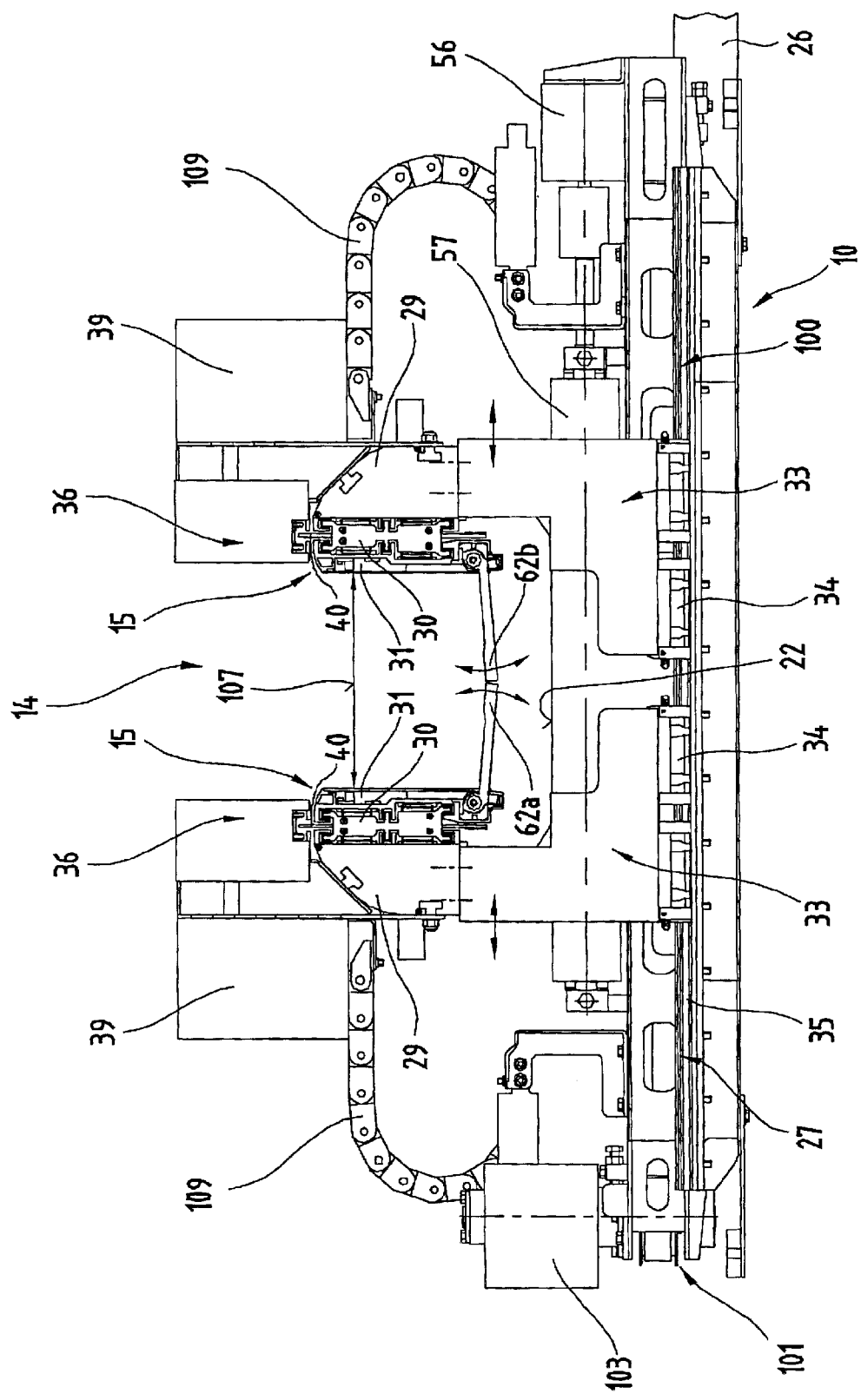
FIG. 8 is a simplified diagram in side view depicting another embodiment of the load-handling system proposed by the invention.
Figure 9:
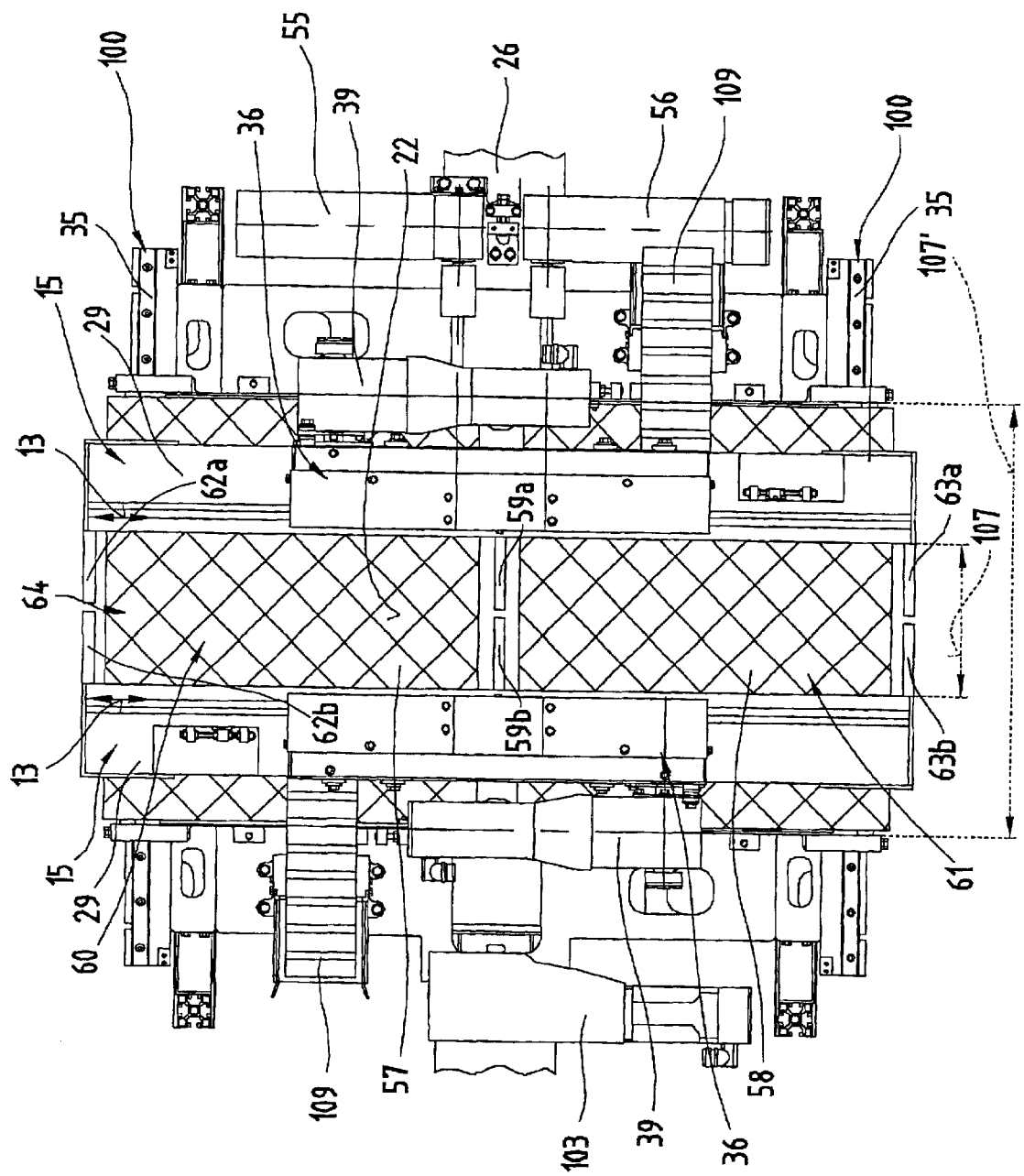
FIG. 9 is a simplified diagram showing a plan view of the load-handling system illustrated in FIG. 8.

FIGS. 8 and 9, which will be described together, illustrate different views of the load-handling system in another embodiment. The load-handling system for transferring storage units 4 into and out of a racking system 2 and picking up storage units 4 from delivery areas and despatching storage units 4 in despatch areas, although not illustrated in detail in these drawings, has mutually spaced telescopic arms 15 on the loading platform 10 of the conveyor vehicle, e.g. rack serving unit 1, which are synchronously extendable in the direction of the rack stage 17 and transversely to the longitudinal direction of the support frame 29—indicated by double arrow 13. The loading platform 10, consisting of the loading-bearing support 26 and the base frame 27, is aligned parallel with the standing surface 6. Each of the telescopic arms 15, consisting of the middle and top slides 30, 31, is displaceable with two bearing slides 33 co-operating with the two respective telescopic arms 15 along guide mechanisms 100 running transversely to the extension direction— indicated by double arrow 13—of the telescopic arms 15. To this end, the bearing slides 33 and the base frame 27 are fitted with complementary guide rails 34, 35 which locate with one another in a positive arrangement. As may be seen from the embodiment illustrated as an example here, the two bearing slides 33 are designed so as to be displaceable by means of two guide mechanisms 100 relative to one another, and the base frame 27 and the length of the guide mechanism 100 is determined by at least a maximum dimension of the storage units 4 to be accommodated between the telescopic arms 15.

The explanation given with reference to FIGS. 3, 4 and 6, 7 of the structure of the support frame 29 and the telescopic arms and the way in which these operate, also applies to these drawings.

The load-handling system illustrated in FIGS. 8 and 9 is suitable for conveying storage units 4 of differing external dimensions, e.g. stowing storage units 4 in the longitudinal direction with a width of between 100 mm and 600 mm, for example, in particular between 200 mm and 500 mm, for example 400 mm. As illustrated in FIG. 8, each of the middle slides 30 has the driver 40, in particular the rack, on a side remote from the loading platform 10. The driving force transmitted to each of the middle slides 30 is generated by the endlessly circulating drive member 36, e.g. chain drive, cogged belt, which positively locates with the driver 40, for which purpose the drive member 36 is coupled with the actuator motor 39. In this embodiment, an actuator motor 39 is assigned to every telescopic arm 15 and the two actuator motors 39 are synchronised. The structure of the drive element 36 co-operating with each telescopic arm 15 and the driver 40 was explained in detail above with reference to FIG. 7.

The drive elements 36 and the actuator motor 39 of the telescopic arms 15 coupled therewith are supported in the region of the inclined side wall 75 of the support frame 29 and fixedly joined thereto by means of a fixing arrangement, not illustrated in detail.

The two bearing slides 33 with the support frame 29 for the telescopic arms 15 secured thereto are synchronously displaceable, by means of a drive system 101, transversely to the extension direction—indicated by double arrow 13—and transversely to the longitudinal direction of the support frame 29.

Figure 10:
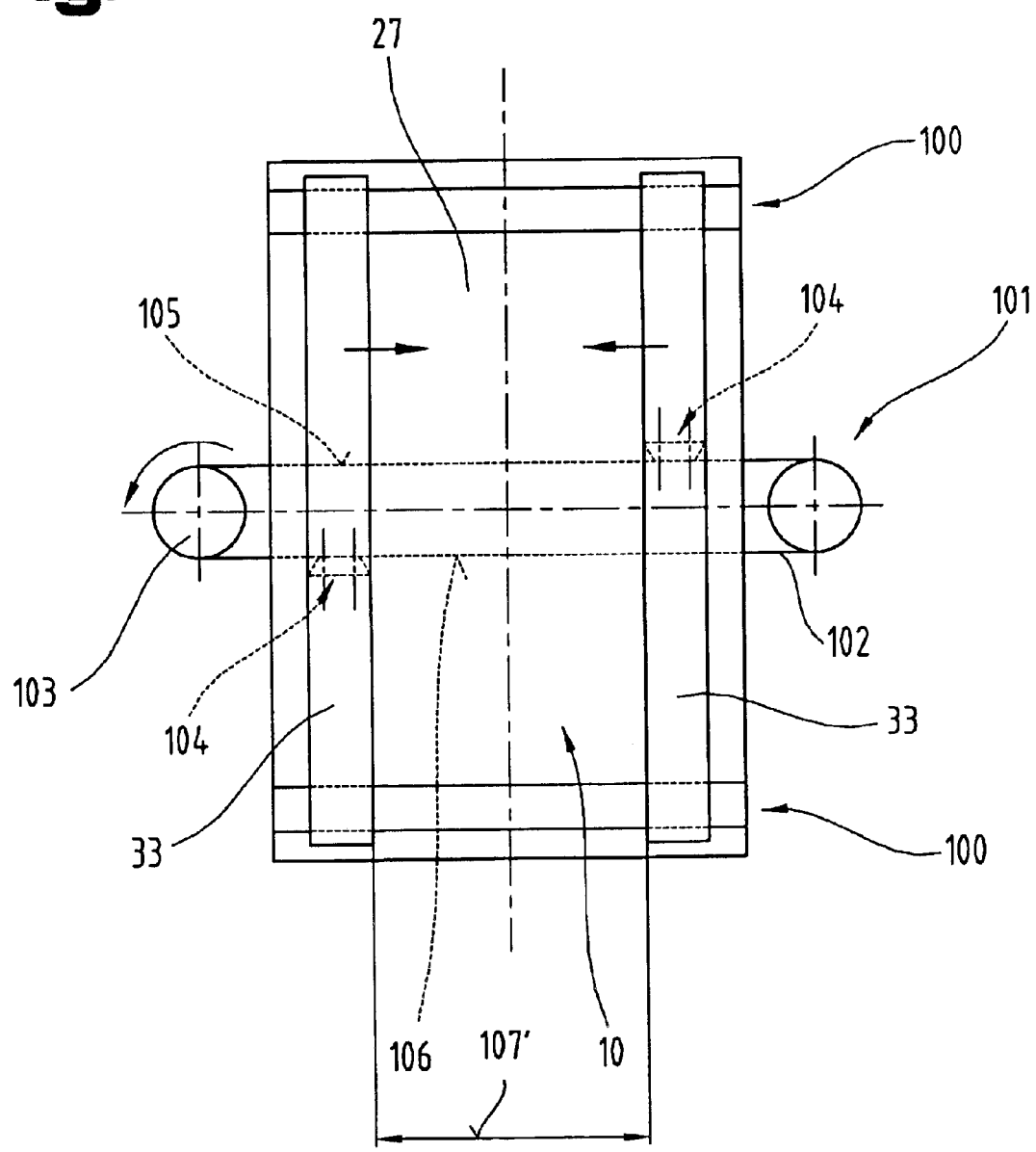
FIG. 10 is a highly simplified, schematic diagram illustrating a plan view of am adjusting mechanism for the two bearing slides, displaceable transversely to the extension direction of the telescopic arms.

The way in which the two bearing slides 33 are displaced in synchronisation is schematically illustrated in FIG. 10, in order to retain clarity in the drawings. The drive system 101 is provided in the form of an endlessly circulating drive element 102, e.g. belt, chain, etc., which can be displaced in circulation by means of a drive motor 103. The bearing slides 33, which can be displaced transversely to the extension direction—indicated by double arrow 13—are guided along the guide mechanisms 100 and are fixedly linked at a predetermined distance by means of a fixing arrangement 104 to a tight side 105 and a slack side 106 of the drive element 102. As also illustrated in FIG. 10, when a driving gear coupled with the drive motor 103 is rotated to the left, the two bearing slides 33 move towards one another, as schematically indicated by the arrows. If the driving gear is rotated to the right, a distance 107, 107' between the bearing slides 33 is increased and the bearing slides 33 are moved apart from one another. Accordingly, the drive motor 103 is designed to change its rotation direction as required and is provided in the form of a servo-motor or slide actuator.

As illustrated in FIG. 9, the support frame 29 and bearing slides 33 and hence the telescopic arms 15 are displaced between a minimum distance 107 determined by the displacement of the oppositely lying drivers 59*a*, 59*b*, 62*a*, 62*b*, 63a, 63b transversely to the extension direction into the operating position—indicated by double arrow 13—and a distance 107' determined by a maximum main dimension, e.g. width, of the non-stowed storage units 4.

As described above, the endless conveyors 57, 58 arranged one after the other form two conveyor zones 60, 61 separable from one another by means of the drivers 59a, 59b, within which or between which at least one storage unit 4 can be pushed.

As also illustrated in FIGS. 8 and 9, the control lines for the actuator motors 39 are set up in energy chains 109 in a manner known from the prior art.

Figure 11:
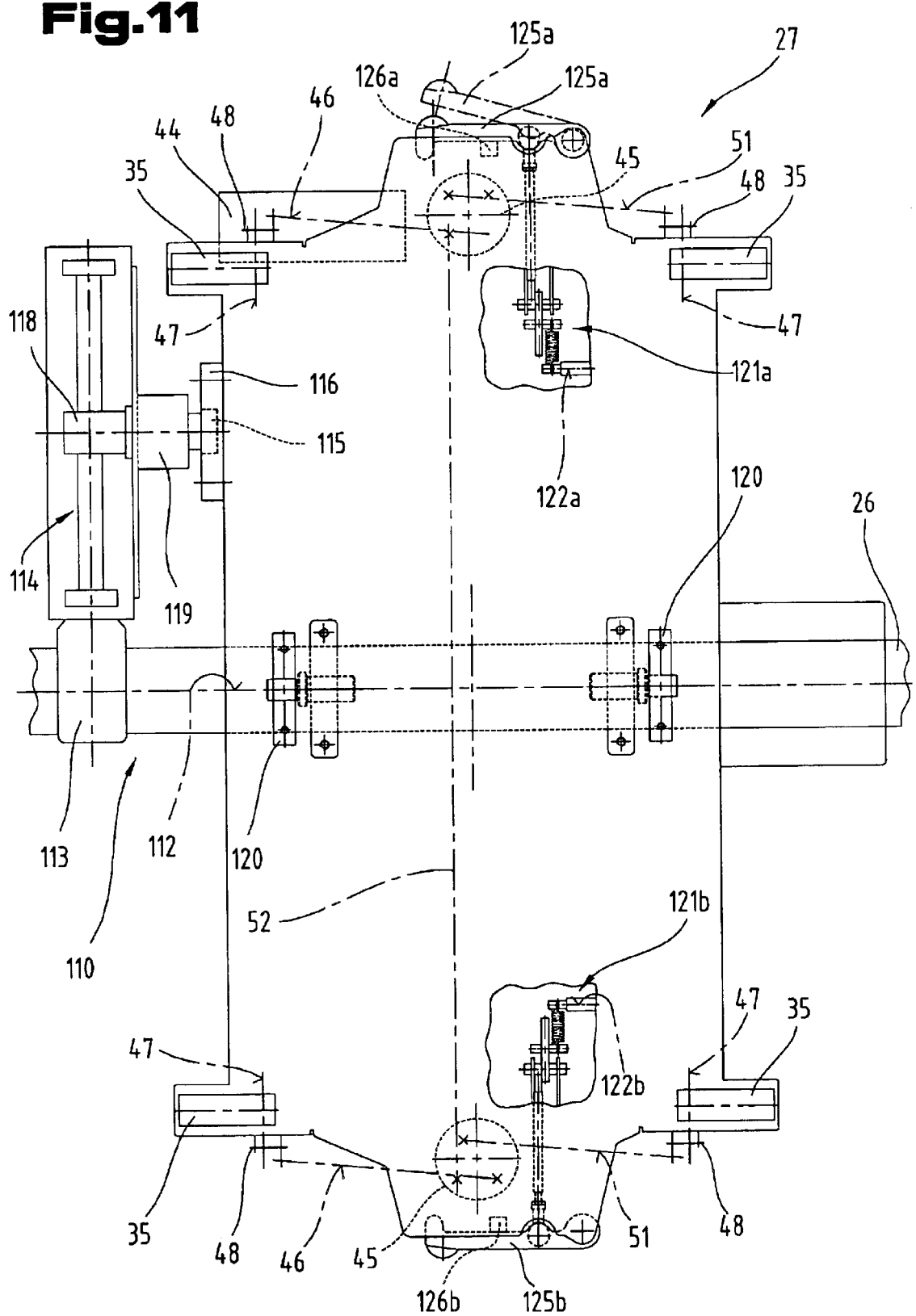
FIG. 11 is a simplified diagram in plan view illustrating a base frame for another embodiment of the load-handling system.
Figure 12:
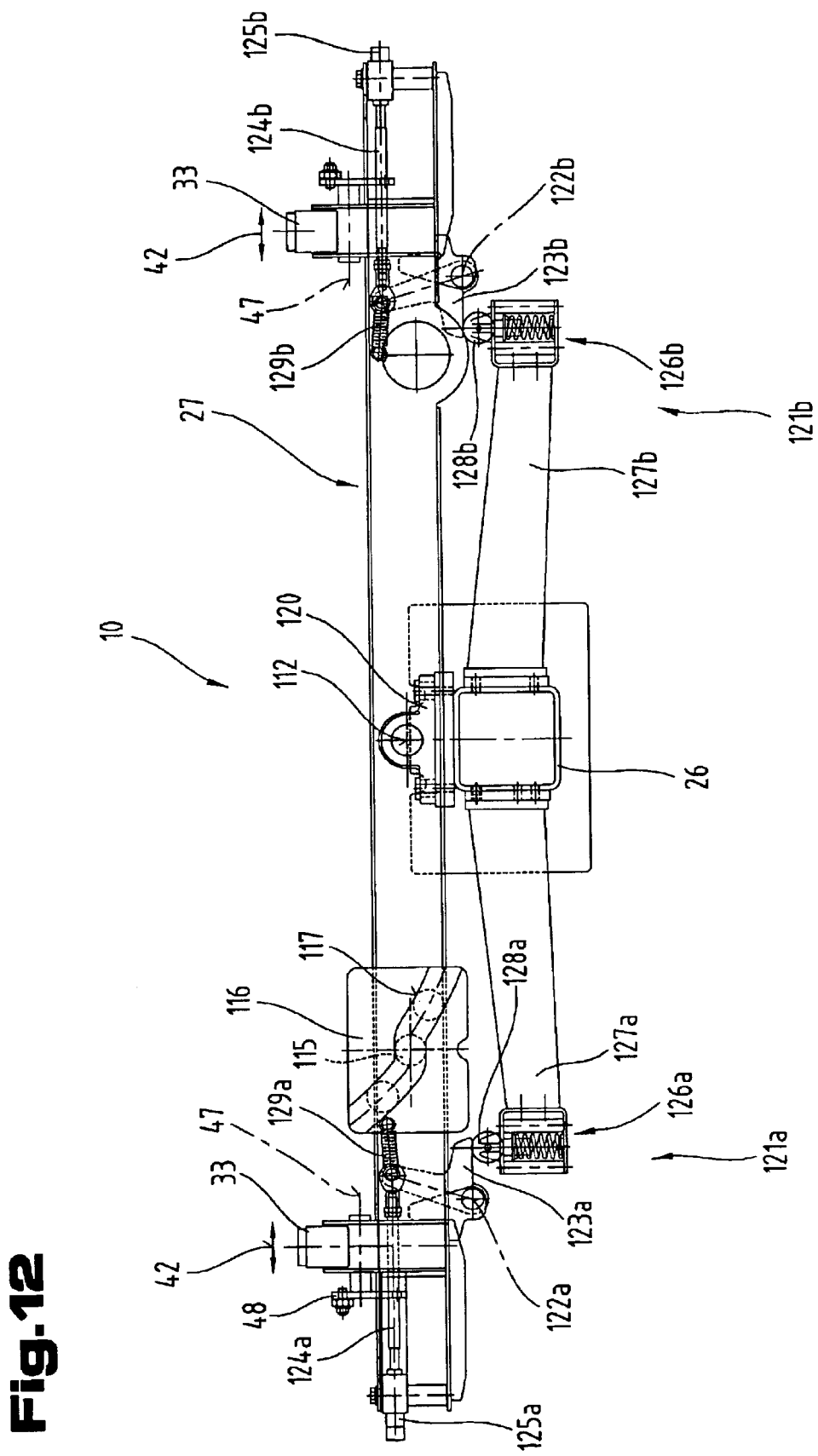
FIG. 12 is a simplified diagram in side view illustrating the base frame of FIG. 11 with a rotary actuator and an operating mechanism.
Figure 13:
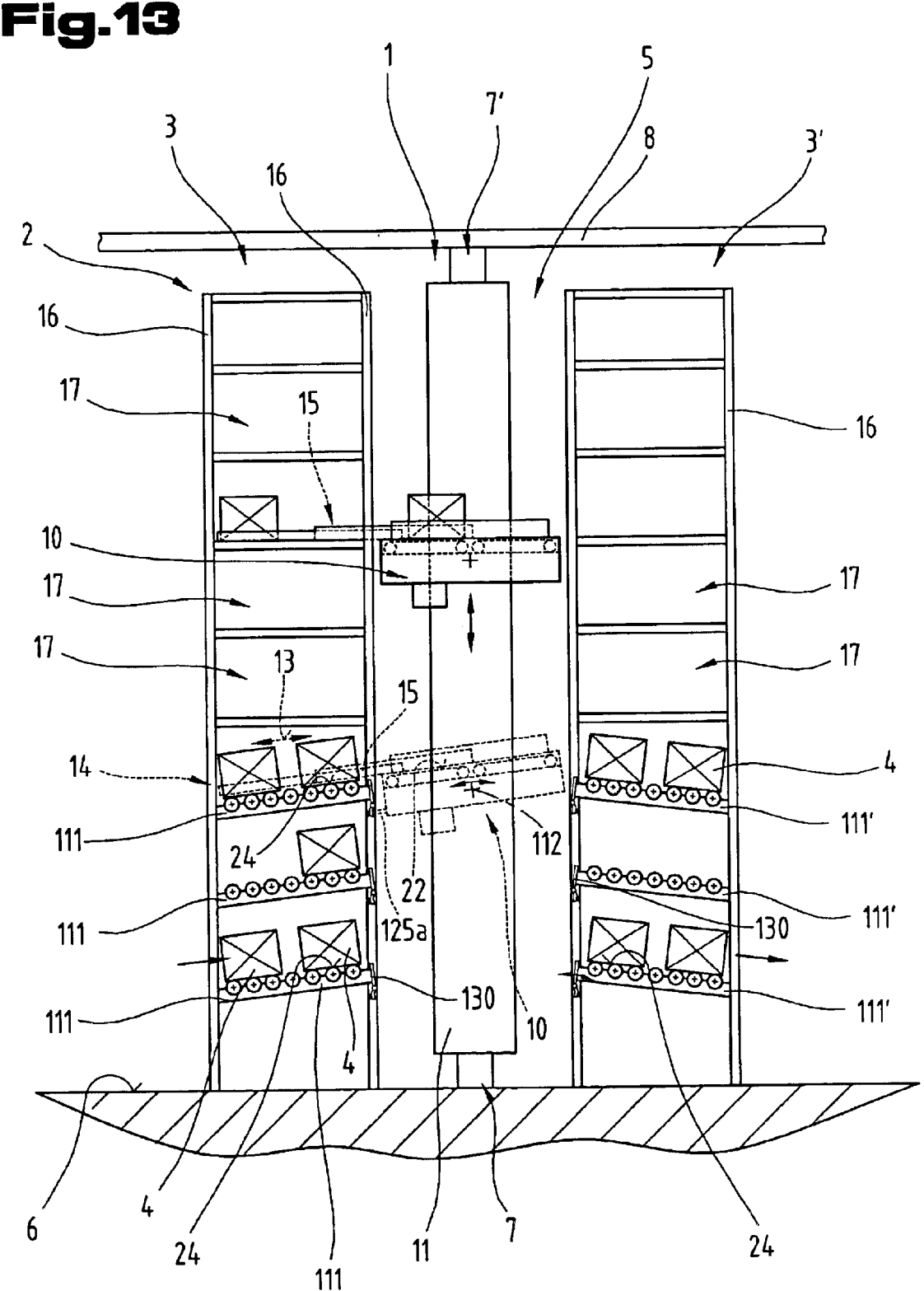
FIG. 13 is a highly simplified, schematic diagram showing a front view of a rack system with the load-handling system and the conveyor vehicle, in particular the rack serving unit, using the base frame of FIGS. 11 and 12 proposed by the invention.

FIGS. 11 to 13, which will be described together, provide simplified diagrams showing different views of the base frame 27 for another embodiment of the load-handling system. The base frame 27 is fixedly joined to the load-bearing support 26. Details of the other features and layouts, such as the guide rail 35, the displacement mechanism 43 with the rod linkages 46, 50 schematically indicated by dotted-dashed lines, lever arms 48, 49 and joints 47, 50 as well as the push rod 52, may be taken from the description given above of FIGS. 3 and 5. With this embodiment, the bearing slides 33 and the telescopic arms 15 borne by them, not illustrated in this drawing, can be displaced—as indicated by double arrow 42—transversely to the extension direction thereof—indicated by double arrow 13. If the load-handling system is equipped with the loading platform 10 consisting of the load-bearing support 26 and the base frame 27, as may be seen in FIGS. 12 and 13, the load-handling system and the retractable unit 14 having the telescopic arms 15 can be displaced by means of a rotary actuator 110 relative to at least a delivery area and despatch area for storage units 4, in particular a conveyor or accumulation line 111, 111', e.g. a commissioning system, in particular tilted about an axis 112. The rotary actuator 110 consists of a linear actuator 114, e.g. a threaded spindle drive, coupled with an actuator motor 113, by means of which a slide block 115, e.g. a mounted roller 115, is displaced along a drive path 117 on a prismatic plate 116 fixed to the base frame 27. A slide part 119 arranged along a guide on the linear actuator 114 is provided between a slide of the linear actuator 114 and the slide bock 115. The slide block 115, in particular the roller 115, is drivelessly mounted on an axle stub integrated in the sliding part 119 and is provided in the form of a roller bearing, in particular a ball bearing.

In the mid-region, the base frame 27 and the load-handling system may be tilted to either side about the pivot axis 112 by means of two block bearings 120, preferably by an angle of between 0° and 12°, in particular between 5° and 8°, for example 7°, relative to the pivot axis 112.

As may be seen more clearly from FIG. 12, the rotary actuator 110 has an operating mechanism 121a, 121b on each side of the load-bearing support 26. The conveyor or accumulation lines 111, 111' disposed one above the other in several planes, are downwardly inclined starting from the rack serving unit 8. The conveyor or accumulation lines 111, 111' are roller conveyors, some of the rollers being provided as brake rollers or brake tongues. The commissioned storage units 4, e.g. containers, are pushed onto the roller conveyor in the direction of the storage units 4 and remain checked at predetermined positions one after the other.

If at least one storage unit 4 has to be picked up by the conveyor or accumulation line 111 from the load-handling system, the load-handling system is positioned at the relevant conveyor or accumulation line 111 so that the conveyor plane 22 of the loading platform 10 and the conveyor plane 24 of the conveyor or accumulation line 111 are flush with one another and so that at least one storage unit 4 is pushed from the conveyor or accumulation line 111 by the synchronously displaceable telescopic arms 15 onto the load-handling system. To effect the requisite pivoting motion of the load-handling system, the slide 118 is moved linearly due to the rotating motion of the threaded spindle, as is the slide block 115, in particular the roller, starting from an initial position indicated by broken lines in FIG. 12, at which the conveyor plane 23 is horizontally aligned with the loading platform 10, along the curving S-shaped drive path 117 for the pivoting displacement to the left of the load-handling system to the conveyor or accumulation line 111 into a first operating position, indicated by broken lines, or if the pivoting motion to the conveyor or accumulation line 111' is to the right, into a second operating position, indicated by broken lines. The operating mechanisms 121a, 121b respectively have a knee-joint 121a, 121b pivotable about an axis 122a, 122b, the free end of the projecting leg of the knee joint 121a, 121b being articulatingly linked via a length-adjustable rod linkage 124a, 124b to an operating lever 125a, 125b, pivotably mounted on the base frame 27. A shorter leg of the knee joint 121a, 121b respectively co-operates with a stop 126a, 126b consisting of a roller 128a, 128b supported on a frame-type bracket 127a, 127b attached to the load-bearing support 26 by means of a spring arrangement. The free end of the projecting leg of the knee joint 121a, 121b is also joined to the base frame 27 by means of a spring arrangement 129a, 129b.

The displacement or tilting action about the axis 112 is effected as described below.

As a result of the progressive motion transmitted from the linear actuator 114 to the slide block 115, guided along the drive path 117, the former is displaced to the left from its initial position into a first operating position, as a result of which the knee joint 123a is displaced or pivoted about the axis 122a against the action of the spring arrangement 129a, in particular a compression spring, by its projecting leg and the operating lever 125a, as shown by dotted-dashed lines in FIG. 11, is moved towards the conveyor or accumulation line 111, as shown in FIG. 13. In this pivoted position, illustrated in FIG. 13, the operating lever 125a is extended and the load-handling system is duly pivoted in such a way that the conveyor plane 22 of the loading platform 10 and the conveyor plane 24 of the conveyor or accumulation line 111 are flush with one another and stop flap 130 arranged on the conveyor or accumulation line 111 on the end face of the rack stage 17 directed towards the rack serving unit 1 is simultaneously displaced. The purpose of the stop flap 130 is preventive and ensures that storage units 4 transferred in the direction of the rack serving unit 1 do not exceed a predetermined front retrieval position, thereby preventing the storage units 4 from falling into the aisle 5.

In their normal position, the stop flaps 130 project beyond the conveyor plane 24 of the conveyor or accumulation line 111. When the stop flap 130 is operated by the outwardly pivoted operating lever 125a, it pivots below the conveyor plane 24 so that the at least one storage unit 4 can be pushed from the conveyor or accumulation line 111 onto the load-handling system. Once the at least one storage unit 4 has been placed on the load-handling system, the linear actuator 114 is displaced in the opposite direction, as a result of which the slide block 115 located in the first operating position is displaced along the drive path 117 towards its initial position and as far as its initial position and the load-handling system is horizontally aligned again. During the return movement of the slide block 115 from its first operating position towards the initial position, the knee joint 123a is displaced to the right by means of the spring arrangement 129a and the shorter leg of the knee joint 123a is pushed downwards against the action of the spring-biassed stop 128a. The base frame 27 therefore acts in the manner of a rocker.

Whilst the operating lever 125a is pulled out, the operating lever 125b remains out of operation on the opposite side of the pivot axis, in other words pushed in.

When the slide block 115 is displaced to the right by means of the linear actuator 114 from its initial position into the other operating position, the left-hand end of the base frame 127 is pivoted up from the pivot axis 112 and the right-hand end is pivoted downwards. At the same time, as described above, the pivoting action of the knee joint 121b against the action of the spring arrangement 129b via the rod linkage 124b operates or swings out the operating lever 125b. Whilst the operating lever 125b is pulled out, the operating lever 125a is pulled in or not operated on the other side of the pivot axis 112.

Similarly, at least one storage unit 4 can be transferred from the loading platform 10 to the despatch area, in particular to the conveyor or accumulation line 111'.

With reference to FIGS. 14 to 19 an explanation will be give as to how the transfer into and out of a rack stage 17 is operated and how the at least one storage unit 4 is picked up from and placed on a conveyor system, e.g. incoming conveyor system 18 or conveyor or accumulation line 111 and transferred to another conveyor system, e.g. outgoing conveyor system 20 or conveyor or accumulation line 111', although for the sake of simplicity, the conveyor system or the rack stage 17 is described as being on the right-hand of the loading platform 10 only. Nevertheless, it would also be possible for the conveyor system or the rack stage 17 to be on the left of the loading platform 10, in which case the operating mode explained below applies accordingly.

The storage units 4, picked up by the conveyor system and identified by means of an identification code, are stacked on the basis of the chaotic principle, whereby an external primary control system ascertains where there are suitable free rack stages 17 and places the at least one storage unit 4 in one of them. The chaotic stacking principle enables continuous monitoring and verification as to which and how many stowage spaces are still free in the rack stages 17 to accommodate storage units 4.

In the description below, a distinction will be made between source commands and target commands. By source commands is meant the removal of at least one storage unit 4 via the retractable unit 14 from the conveyor system 18, 111 or from the racking unit 2. Target commands are commands whereby at least one storage unit 4 is placed on the conveyor system 20, 111' downstream of the loading platform 10.

The sequence in which source commands are handled will be described by way of example with reference to FIGS. 14 to 17.

Figure 14:
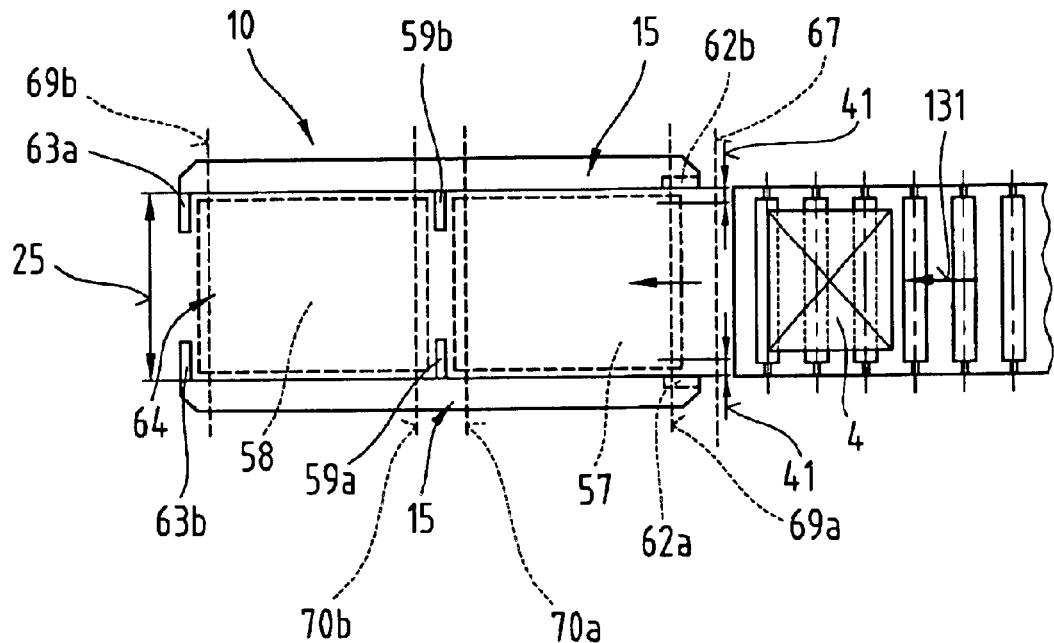
FIG. 14 is a highly simplified, schematic diagram illustrating a plan view of the load-handling system and a conveyor mechanism, during the first operating step.

As may be seen from FIG. 14, the storage unit 4 located in the despatch area, e.g. the conveyor system, is to be transferred to the loading platform 10. Once the loading platform 10 with the storage unit 4 held on it is positioned opposite the conveyor system and the storage unit 4 is placed on it and the displaceable telescopic arms 15 are moved to the maximum distance 25 apart from one another transversely to the feed direction 131 of the storage unit 4 by the predeterminable centring motion 41 and the two drivers 62a, 62b on the side facing the conveyor system are in their non-operating position outside of the conveyor path 64, as schematically illustrated in FIG. 6, the storage units 4 can be picked up by the conveyor system. All these procedures are effected during the motion along the main axes and hence during the displacement of the rack serving unit 1 along the tracks 7, 7' and/or the upward displacement of the loading platform 10.

Once the loading platform 10 is positioned in front of the conveyor system, the storage unit 4 is conveyed towards the loading platform 10. The circulation speed of the endless conveyor 5 and the feed speed of the storage unit 4 are synchronised during this process. The retrieval procedure can be regarded as complete when the transmission and reception beam of the optical sensor 67 is no longer interrupted and the storage unit 4 is therefore entirely situated on the loading platform 10 or on the endless conveyor 57, whereupon the main axial displacements are run again. After passing the optical sensor 67, the transmission and reception beam thereof is no longer interrupted because the storage unit 4 is on the loading platform 10 and the telescopic arms 15 displaceable by the centring motion 41 are moved towards one another by the amount of the centring motion 41 transversely to the feed direction 131 of the storage unit 4 and at least the drivers 62a, 62b and 63a, 63b and optionally the drivers 59a, 59b are simultaneously displaced into their operating position. As a result, if the storage unit 4 is at an angle to the mutually parallel telescopic arms 15, it can be centred and aligned between the telescopic arms 15 as it is being transferred to the loading platform 10 so that opposing side faces 132 of the storage unit 4 extend substantially parallel with the external boundary 133 of the telescopic arms 15. This prevents any jamming of the storage unit 4 between the telescopic arms 15 as it is being conveyed on the loading platform 10. The pre-settable centring motion 41 is dimensioned so that a gap is left between the opposing side faces 132 of the storage unit 4 and the outer boundaries 133 of the two telescopic arms 15 directed towards one another and the storage unit 4 is supported sitting freely on the endless conveyor 57. The gap may be between 2 mm and 15 mm, in particular between 4 mm and 10 mm, for example 6 mm.

Figure 15:
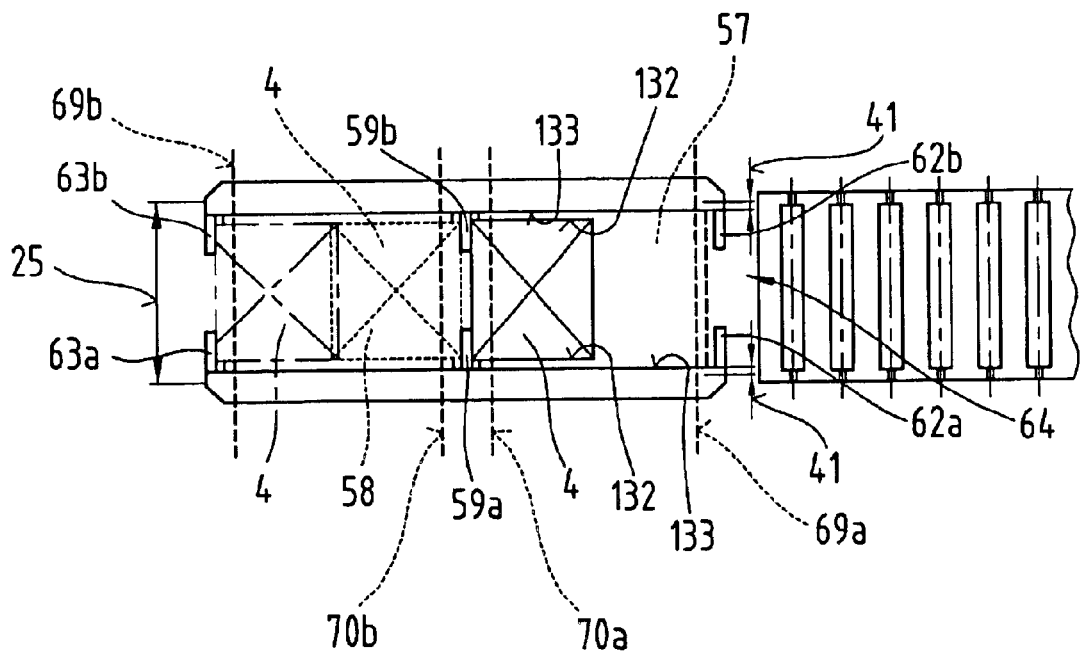
FIG. 15 is a highly simplified, schematic diagram illustrating a plan view of the load-handling system and a conveyor system, during another operating step.

In step 2, illustrated in FIG. 15, it is assumed that the other drivers 59a, 59b in the middle region and the drivers 62a, 62b; 63a, 63b in the distal end regions have been displaced into their operating positions and the storage unit 4 located on the loading platform 10 or on the endless conveyor 57 has been placed by an external primary control system in a position corresponding to a predetermined position pending insertion of the storage unit 4 in the rack stage 17 or the storage unit 4 has been discharged onto the loading platform 10 alongside the conveyor system in a predetermined discharge position. If the storage unit is to be stowed on the racking side facing the endless conveyor 57, for example, the storage unit 4 is positioned with the aid of the optical sensor 70a against the central pair of drivers 59a, 59b. If, however, the storage unit 4 is to be stored on a racking side facing the endless conveyor 58 downstream in the feed direction 131, the storage unit 4 must be switched to the endless conveyor 58, for which purpose the middle pair of drivers 59a, 59b must be displaced into their non-operating position. The storage unit 4 is conveyed from the endless conveyor 57 onto the endless conveyor 58 and positioned with the aid of the optical sensor 69b towards the outer pair of drivers 63a, 63b— as indicated by broken lines.

By preference, once the storage unit 4 has been conveyed onto the endless conveyor 58, the drivers 59a, 59b, which are still in an opened, operating position, must be moved back into their operating position. The storage unit 4 is then positioned against the middle pair of drivers 59a, 59b, which are in their operating position—as indicated by broken lines. The load-handling system is then ready to transfer the storage unit 4 onto the relevant rack stage 17 pre-selected by the control system or onto the relevant conveyor system pre-selected by the control system.

Although not illustrated in detail, if two storage units 4 on the conveyor system are directly touching one another as they are pushed onto the load-handling system, the endless conveyor 57 facing the conveyor system and having a higher circulation speed than the conveyor system is operated so as to leave a gap between the storage units 4 being transported on the load-handling system. As soon as the next storage unit 4 in the feed direction 131 passes the optical sensor 67, the main axial displacements of the rack serving unit 1 can be effected. In the next step, the two storage units 4 on the load-handling system are firstly moved in the opposite direction and positioned in the immediate vicinity of the drivers 62a, 62b; 63a, 63b, whereupon the storage units 4 are positioned in a predetermined discharge position pre-selected by the control system by means of the optical sensors 69a, 69b; 70a, 70b in the immediate vicinity of the drivers 59a, 59b; 62a, 62b; 63a, 63b and towards the latter. By preference, the storage unit 4 does not come into contact with the drivers 59a, 59b; 62a, 62b; 63a, 63b so that the storage unit 4 does not push them out of the operating position into the non-operating position during the displacement.

If the two storage units 4 have to be discharged on the racking side facing the endless conveyor 58, for example, the storage unit 4 located on the endless conveyor 58 is positioned by means of the optical sensor 70b towards the middle drivers 59a, 59b and the second storage unit 4 on the endless conveyor 57 is moved towards the drivers 62a, 62b. If the two storage units 4 are to be pushed out of the racking side facing the endless conveyor 57, the storage unit 4 on the endless conveyor 57 is moved towards the middle drivers 59a, 59b and the storage unit 4 on the endless conveyor 58 is moved towards the drivers 63a, 63b.

Naturally, there is always the possibility that a storage unit 4 has already been set down on the load-handling system, e.g. on the endless conveyor 58, which means that before picking up the other storage unit 4 from the conveyor system, the telescopic arms 15 will firstly have to be moved apart from one another transversely to the feed direction 131 of the storage unit 4 and the middle drivers 59a, 59b moved into their operating position.

When transferring at least one storage unit 4 from the conveyor system onto the loading platform 10, the telescopic arms 15 remain retracted.

Figure 16:
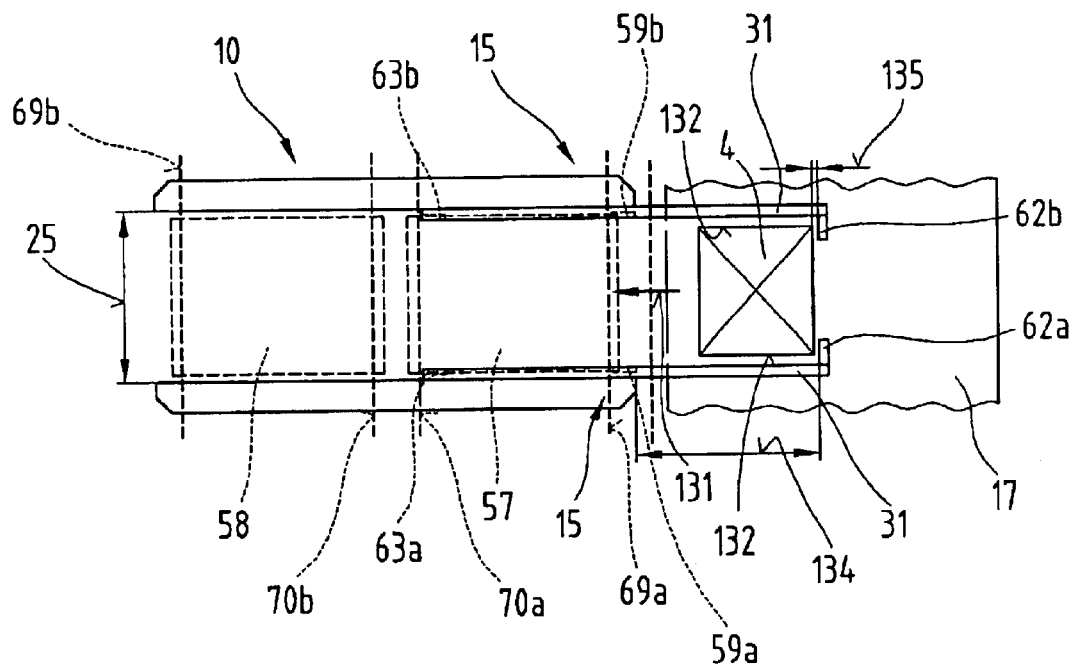
FIG. 16 is a highly simplified, schematic diagram illustrating a plan view of the load-handling system with extended telescopic arms and a rack stage during the first operating step.
Figure 17:
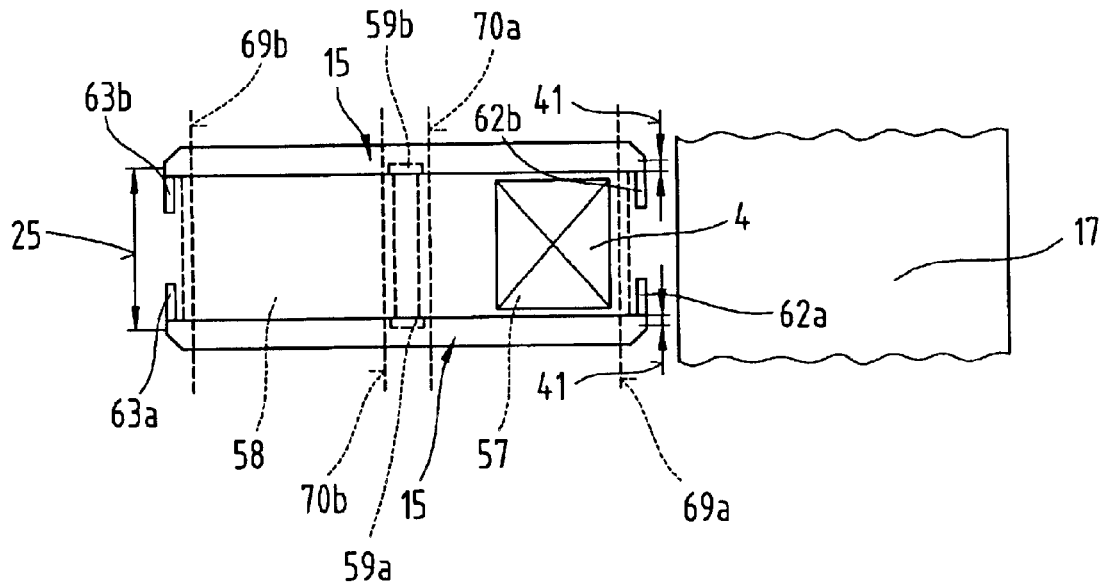
FIG. 17 is a highly simplified, schematic diagram illustrating a plan view of the load-handling system with retracted or withdrawn telescopic arms and a rack stage during the second operating step.

As illustrated in FIGS. 16 and 17, which will be described together, a storage unit 4 stowed on the rack stage next to an aisle is waiting to be transferred to the load-handling system. The storage unit 4 is taken out of the rack stage 17 by means of the telescopic arms 15. If the load-handling system is positioned opposite the storage unit 4 in the aisle direction—indicated by arrow 9—and is positioned at the correct height, and the telescopic arms 15 have been moved apart by the centring motion 41 transversely to the feed direction 131 of the storage unit 4, and all drivers 59a, 59b; 62a, 62b; 63a, 63b have been moved into their non-operating position, the telescopic arms 15 can be synchronously extended. After extending the telescopic arms 15 by an extension length 134, a pair of drivers 62a, 62b is moved past the storage unit 4 on both sides of the storage unit 4 in the transverse direction to the feed direction 131 of the storage unit, whereupon the pair of drivers 62a, 62b on the side of the storage unit 4 remote from the loading platform 10 is extended perpendicular to the feed direction 131 and into a position overlapping with the storage unit 4 in the feed direction 131, after which the storage unit 4 is pushed into the region of the loading platform 10.

The extension length 134 of the telescopic arms 15 is determined by the dimension plus a minimum distance 135 measured in the feed direction 131 between a side face of the storage unit 4 facing the drivers 62a, 62b and the drivers 62a, 62b. The minimum distance 135 is predetermined by the primary control system. The minimum distance 135 is between 2 mm and 30 mm, in particular between 5 mm and 20 mm, for example 20 mm. This will ensure that as the drivers 62a, 62b are displaced, they will not be pivoted against the side faces 132 of the storage unit 4, even if its side walls are deformed, thereby preventing any damage to the storage unit 4.

Once the drivers 62a, 62b have been pivoted, the storage unit 4 is pushed in the feed direction 131 onto the load-handling system, and the endless conveyor 57 facing the rack stage 17 is set in motion during the return travel of the telescopic arms 15. The circulation speed of the endless conveyor 57 must be synchronised with the speed of travel of the synchronously displaceable telescopic arms 15. If the storage unit 4 is on the endless conveyor 57, the distance 25 between the telescopic arm for the centring motion 41 of the two telescopic arms 15 is reduced and the storage unit is aligned and positioned on the load-handling system if necessary. During the return travel of the telescopic arms 15 in the feed direction 131 of the storage unit 4, the drivers 63a, 63b and/or the drivers 59a, 59b are simultaneously moved out of the non-operating position inside the telescopic arms 15 into their operating position. Depending on what other manoeuvre is to be performed with the storage unit 4, it is shifted into a predetermined placement position on the loading platform 10 or onto the two endless conveyors 57, 58, as explained above. Naturally, a situation might also occur in which two storage units 4 have to be transferred from the rack stage 17 to the loading platform 10 or there might already be a storage unit 4 on one of the endless conveyors 57; 58, the procedural sequence for this situation having been explained above with reference to FIGS. 14 and 15.

Figure 18:
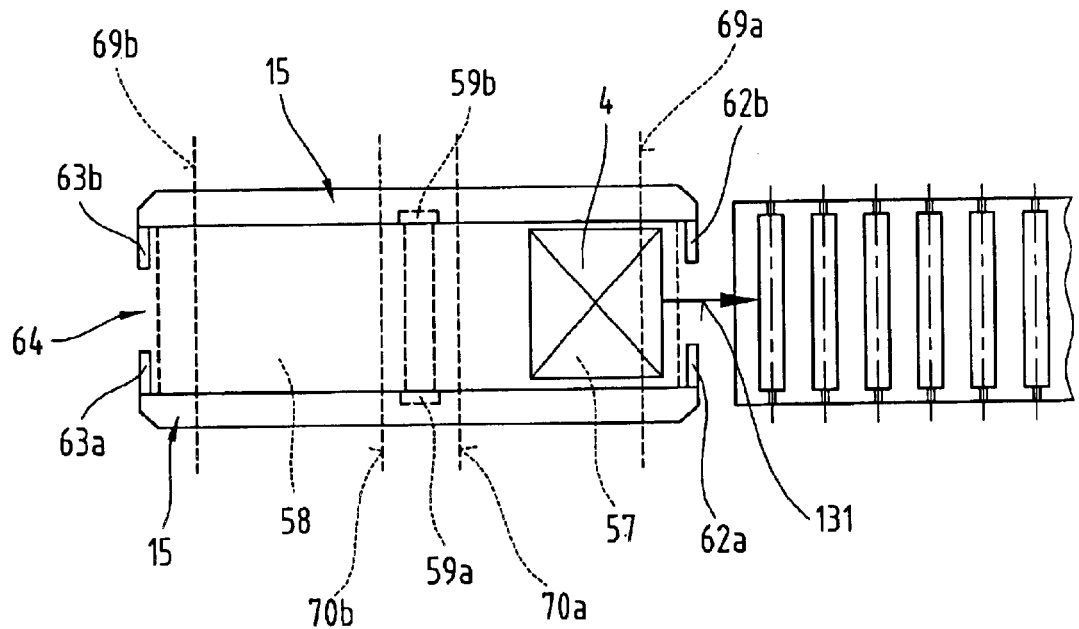
FIG. 18 is a highly simplified, schematic diagram illustrating a plan view of the load-handling system and a conveyor system during the first operating step.
Figure 19:
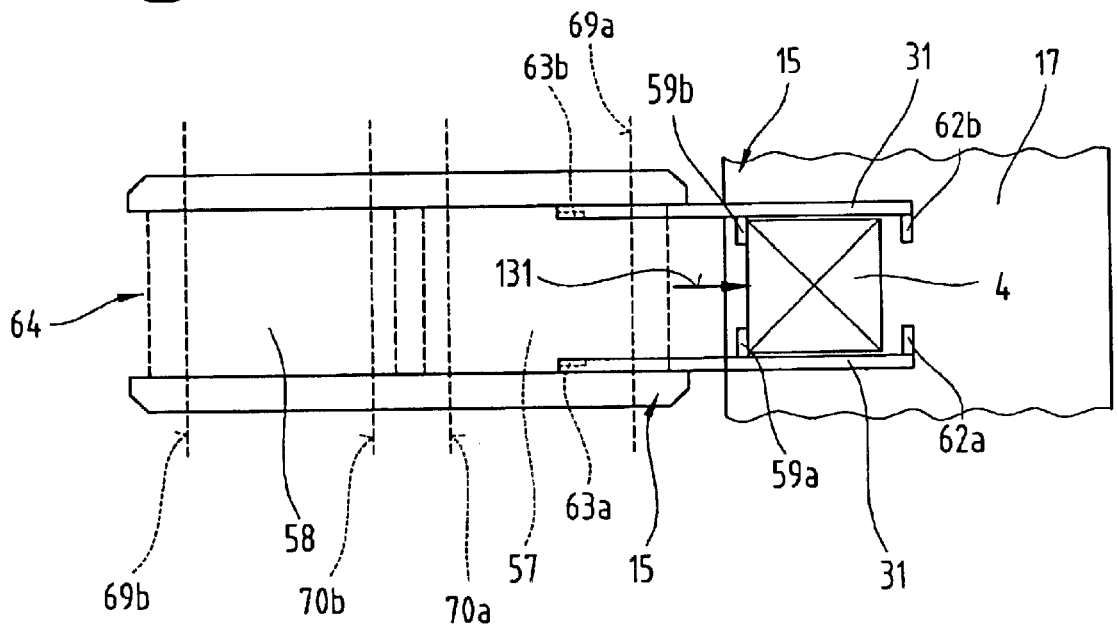
FIG. 19 is a highly simplified, schematic diagram illustrating a plan view of the load-handling system with extended telescopic arms and a rack stage, during the second operating step.

In the second situation relating to target commands, storage units 4 are transferred to the conveyor system or the rack bay 3', as schematically illustrated in FIGS. 18 and 19. One possible embodiment of how the storage unit 4 on the load-handling system is placed in the rack stage 17 is illustrated in FIG. 18. If the storage unit 4 is to be conveyed onto the conveyor system facing the endless conveyor 57, the storage unit 4, aligned between the telescopic arms 15, is conveyed to the region near to the drivers 62a, 62b, which are in the operating position, and after positioning the main axes, the pair of drivers 62a, 62b is moved to the non-operating position, after which the storage unit 4 is conveyed to the downstream conveyor system by means of the activated endless conveyor 57.

As illustrated in FIG. 19, the storage unit 4 is waiting to be transferred to the rack stage 17. If the storage unit 4 has to be transferred to the rack stage 17 facing the endless conveyor 57 at a predetermined placement position, it is preferable to shift the position of the storage unit 4 by means of the optical sensor 70a towards the drivers 59a, 59b, which are in the operating position, simultaneously with the selective travel on the main axes of the rack serving unit 1, in other words as it draws alongside a specific position in the aisle direction—indicated by double arrow 9—and in the height direction on the endless conveyor 57. For practical purposes, the drivers 62a, 62b are also moved into the operating position before the telescopic arms 15 are slid out. The distance 25 between the telescopic arms 15 displaceable transversely to the feed direction 131 of the storage unit 4 for the centring motion 41 of the telescopic arms 15 is reduced. When the storage unit 4 reaches a desired position on the rack stage 17, the telescopic arms 15 are moved apart from one another by the centring motion 41 to the maximum distance 25, the drivers 59a, 59b and 62a, 62b are moved into the non-operating position and the telescopic arms 15 are synchronously retracted.

The operating mode for transferring the storage unit 4 and placing it onto the conveyor system arranged facing the endless conveyor 58 or the rack stage 17 disposed facing the endless conveyor 58, was described above with reference to FIGS. 14 and 17 and will not be repeated here.

The same applies to transferring two storage units 4 located on the endless conveyors 57, 58 of the load-handling system onto the conveyor system or the rack stage 17.

Naturally, it would also be possible for the storage unit 4 to be positioned in the rack stage 17 instead of only on the load-handling system. In this case, the storage unit 4 is in the rack stage 17, e.g. between the two pairs of drivers 59a, 59b and 62a, 62b and a displacement is effected beyond the predetermined placement position for the storage unit 4 on the rack stage 17 and the difference in distance between the desired position and the incorrect position detected, after which the two telescopic arms 15 are retracted by a return length calculated by the control system so that the storage unit 4 is shifted to the predetermined desired position. Once the storage unit 4 is in the desired position in the rack stage 17, the telescopic arms 15 are synchronously displaced by the minimum distance 135 between the side face of the storage unit 4 facing the drivers 62a, 62b measured in the feed direction 131 of the storage unit 4, the drivers 59a, 59b and 62a, 62b are switched from their operating position into the non-operating position, after which the telescopic arms 15 are moved back in the direction of the load-handling system. If the drivers 62a, 62b have to be returned to the non-operating position, the minimum distance 135 between the side face of the storage unit 4 facing the load-handling system and the drivers 59a, 59b is firstly set by the return travel of the telescopic arms 15. This ensures that there is no risk of the storage unit 4 being pushed or jolted by the motion of the drivers 59a, 59b.

At this stage, it should be pointed out that the operating mode for transferring into and out of a rack stage 17 or picking up or setting down storage units 4 on or off the conveyor system is used not only to handle storage units 4 of the same dimensions, as illustrated, but instead is also capable of handling storage units 4 of different dimensions. If the storage units 4 to be handled are of the same dimensions in terms of length and width, the load-handling system illustrated in FIGS. 3 to 5 is used, whilst the load-handling system illustrated in FIGS. 8 to 10 is used for handling different dimensions.

It is of advantage that the storage unit 4 is moved exclusively by its side faces arranged one after the other in its feed direction 131 into a position overlapping with the drivers 59a, 59b; 62a, 62b; 63a, 63b switched to their operation position and by a thrust force dependent on the feed direction 131 of the storage unit 4, rather than being clamped between telescopic arms 15, as is the case with the prior art, thereby avoiding the disadvantage of deforming the side walls of the storage unit 4.

Finally, it should be pointed out that the loading platform 10 has more than two, e.g. three or four, conveyor zones in the feed direction 131 of the storage unit 4 arranged one after the other and divided by other pairs of drivers.

For the sake of good order, it should finally be pointed out that in order to provide a clearer understanding of the structure of the support frame and the load handling system, they and their constituent parts have been illustrated out of scale to a certain extent and/or on an enlarged and/or reduced scale.

The tasks underlying the independent inventive solutions can be found in the description.

Above all, the subject matter relating to the individual embodiments illustrated in FIGS. 1 to 19 can be construed as independent solutions proposed by the invention. The tasks and solutions can be found in the detailed descriptions relating to these drawings.

What is claimed is:

1. A telescopic arm of a load-handling system for transferring storage units into and out of a rack stage of a racking system,
   (a) the telescoping arm being displaceably supported on a support frame having the form of a hollow section and comprising
      (1) a plate-shaped slide and a plate-shaped top slide, the middle slide and top slide being displaceable relative to each other and to the support frame, and the middle slide being slidably guided between the support frame and the top slide,
   (b) the support frame comprising
      (1) a first upright longitudinal side wall directed towards the middle slide, a second upright longitudinal side wall opposite the middle slide, a bottom side wall and a top side wall, the bottom and top side walls extending between the upright longitudinal side walls, and
      (2) lateral guide tracks and a vertical guide track arranged on the first upright longitudinal side wall between the longitudinal peripheral regions of the bottom and top side walls for laterally and vertically guiding the middle slide along the support frame, each guide track extending in the longitudinal direction and essentially along the entire length of the support frame,
   (c) the top slide comprising lateral guide tracks and a vertical track guide directed towards the support frame, each guide track extending in the longitudinal direction and essentially along the entire length of the top slide,
   (d) the middle slide comprising oppositely disposed sidewalls and guide lands arranged on both of the oppositely disposed side walls and protruding into said lateral and vertical guide tracks of the support frame and the top slide, each guide land extending in the longitudinal direction and essentially along the entire length of the middle slide,
   (e) at least two drivers arranged on each distal end region of the top slide, the drivers being displaceable transversely to the longitudinal direction of the top slide from a rest position into an operating position, whereby a respective one of the drivers in the rest position is able to be positioned in a seating region in the top slide and, in the operating position, the driver projects beyond an external boundary of the top slide and overlaps a respective one of the storage units at one of two opposing front and rear side faces thereof relative to an extension direction of the telescopic arm, and (f) an actuator motor arranged on the top slide for moving each driver between the rest and operating position.

2. Telescopic arm according to claim 1, wherein the lateral and vertical guide tracks of the support frame are groove-shaped recesses in the hollow section.

3. Telescopic arm according to claim 2, wherein the lateral guide tracks have a U-shaped cross section and guide surfaces extending parallel to the first longitudinal side wall, and the vertical guide tracks have a U-shaped cross section and guide surfaces extending perpendicular to the first longitudinal side wall.

4. Telescopic arm according to claim 1, wherein the lateral and vertical guide tracks of the top slide are groove-shaped recesses.

5. Telescopic arm according to claim 4, wherein the lateral guide tracks have a U-shaped cross section and have guide surfaces extending parallel to an upright side face of the top slide, and the vertical guide tracks have a U-shaped cross section and guide surfaces extending perpendicular to the upright side face.

6. Telescopic arm according to one of claim 1, wherein the vertical guide track of the support frame and the top slide is disposed between the lateral guide tracks extending parallel and at a distance from one another in the longitudinal direction.

7. Telescopic arm according to claim 1, wherein the vertical and lateral guide tracks have guide surfaces with a friction coating.

8. Telescopic arm according to claim 1, wherein the top slide comprises an additional driver arranged in a middle region between the drivers in the distal end regions.

9. Telescopic arm according to claim 1, wherein the drivers are flaps pivotable 90° about an axis extending in the longitudinal direction of the top slide and between the rest position and the operating position by the actuator motors.

10. Telescopic arm according to claim 9, further comprising torque-transmitting drive elements for the flaps, the torque-transmitting drive elements being coupled with the actuator motors and being fixedly arranged in a substantially U-shaped recess in the top slide extending in the longitudinal direction thereof.

11. Telescopic arm according to claim 1, comprising two sensors monitoring the rest and operating positions which are assigned to every displaceable driver, and each of the sensors is fixedly arranged in a substantially U-shaped recess formed in the top slide extending in the longitudinal direction of the top slide.

12. Telescopic arm according to claim 11, wherein control lines and interfaces for power and signals are arranged in at least one of the U-shaped recesses.

13. Telescopic arm according to claim 1, comprising guide rails arranged on the guide lands.

14. Telescopic arm according to claim 13, wherein the guide rails are made from synthetic material.

15. Telescopic arm according to claim 1, wherein the middle slide has a roller in each distal end region, the axis of which is aligned parallel with the upright longitudinal side walls, the diameter of the rollers being slightly larger than a width, as measured between parallel extending longitudinal side walls.

16. Telescopic arm according to claim 1, wherein the middle slide has at least one fixedly mounted driving element extending essentially along the entire length of the middle slide, and for transmitting a driving force to the middle slide.

17. Telescopic arm according to claim 1, wherein the middle slide is a moulding of fibre-reinforced synthetic material.

18. Telescopic arm according to claim 1, wherein the hollow section is an extruded aluminum section.

19. Telescopic arm according to claim 1, wherein the top slide is an extruded aluminum section.

20. Telescopic arm according to claim 1, comprising at least one traction drive linking the support frame and the top slide for displacing the telescopic arm in a first direction, the traction drive including a belt comprising tension plies and guided by a roller arranged on a leading end of the middle slide in the extension direction of the telescopic arm, the belt having a first end secured to the support frame and a second end secured to the top slide, some of the tension plies being connected by an interface to lines arranged on the support frame, power or signals being transmitting between the lines, and actuating means and a monitoring system disposed on the top slide.

21. Telescopic arm according to claim 20, wherein the actuating means is comprised of said acutator motors for the drivers and the monitoring system comprises sensors for monitoring the end positions of the drivers.

22. Telescopic arm according to claim 20, wherein the tension plies are made from an electrically conductive material.

23. Telescopic arm according to claim 1, wherein the support frame is made in a single piece.

24. Telescopic arm according to claim 1, wherein the top slide is made in a single piece.

25. A load-handling system arranged on a vertically and horizontally movable loading platform of a conveyor vehicle for transferring storage units into and out of a rack stage of a racking system, comprising (a) two telescoping arms synchronously displaceable and supported on two support frames having the form of a hollow section, the support frames extending parallel to, and at a distance from, each other, each telescopic arm comprising (1) a plate-shaped middle slide and a plate-shaped top slide, the middle slide and top slide being displaceable relative to each other and to the support frame whereon it is supported, and the middle slide being slidably guided between the support frame and the top slide, (b) each support frame comprising (1) a first upright longitudinal side wall directed towards the middle slide, a second upright longitudinal side wall opposite the middle slide, a bottom side wall and a top side wall, the bottom and top side walls extending between the upright longitudinal side walls, and (2) lateral guide tracks and a vertical guide track arranged on the first upright longitudinal side wall between longitudinal peripheral regions of the bottom and top side walls for laterally and vertically guiding the middle slide along the support frame, each guide track extending in the longitudinal direction and essentially along the entire length of the support frame, (c) the top slide comprising lateral guide tracks and a vertical track guide directed towards the support frame, each guide track extending in the longitudinal direction and essentially along the entire length of the top slide, (d) the middle slide comprising oppositely disposed sidewalls and guide lands arranged on both of the oppositely disposed side walls and protruding into said lateral and vertical guide tracks of the support frame and the top slide, each guide land extending in the longitudinal direction and essentially along the entire length of the middle slide, (e) at least two drivers arranged on each distal end region of the top slide, the drivers being displaceable transversely to the longitudinal direction of the top slide from a rest position into an operating position, whereby a respective one of the drivers in the rest position is able to be positioned in a seating region in the top slide and, in the operating position, the driver projects beyond an external boundary of the top slide and overlaps a respective one of the storage units at one of two opposing front and rear side faces thereof relative to an extension direction of the telescopic arm, and (f) an actuator motor arranged on the top slide for moving each driver between the rest and operating position.

26. Load-handling system according to claim 25, comprising a support surface forming a conveyor plane between the two support frames, and the support frames and telescopic arms forming a lateral boundary of a conveyor path disposed between the support frames.

27. Load-handling system according to claim 26, wherein the support surface is an endless conveyor disposed on the loading platform between the support frames and telescopic arms.

28. Load-handling system according to claim 27, comprising synchronized actuator motors for the telescopic arms and the endless conveyor.

29. Load-handling system according to claim 25, wherein the support frames with the telescopic arms are displaceable relative to each other transversely to the longitudinal direction of the support frames.

* * * * *